(12) United States Patent
Rivera

(10) Patent No.: US 9,242,790 B2
(45) Date of Patent: Jan. 26, 2016

(54) METHOD FOR TAMPING BREWING MATERIAL USING A SELF TAMPING SINGLE SERVING BREWING MATERIAL HOLDER

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 0 days.

(21) Appl. No.: 14/222,333

(22) Filed: Mar. 21, 2014

(65) Prior Publication Data

US 2015/0264955 A1 Sep. 24, 2015

Related U.S. Application Data

(63) Continuation-in-part of application No. 11/777,831, filed on Jul. 13, 2007, now Pat. No. 8,720,320, and a continuation-in-part of application No. 12/610,181, filed on Oct. 30, 2009, now Pat. No. 8,621,981, and a continuation-in-part of application No. 12/620,584, filed on Nov. 17, 2009, now Pat. No. 8,291,812, and a continuation-in-part of application No. 12/762,262, filed on Apr. 16, 2010.

(51) Int. Cl.
*A23F 5/26* (2006.01)
*B65D 85/804* (2006.01)
*A47J 31/057* (2006.01)
*A47J 31/44* (2006.01)
*A47J 31/06* (2006.01)

(52) U.S. Cl.
CPC ............... *B65D 85/804* (2013.01); *A23F 5/26* (2013.01); *A23F 5/262* (2013.01); *A47J 31/057* (2013.01); *A47J 31/06* (2013.01); *A47J 31/0647* (2013.01); *A47J 31/0663* (2013.01); *A47J 31/0689* (2013.01); *A47J 31/44* (2013.01); *A47J 31/446* (2013.01)

(58) Field of Classification Search
CPC .......... A23F 5/26; A23F 5/262; A47J 31/446; A47J 31/0647; A47J 31/44; A47J 31/057; A47J 31/0689; A47J 31/0663; A47J 31/06
See application file for complete search history.

(56) References Cited

U.S. PATENT DOCUMENTS 2,433,815 A 12/1947 Laforge
3,022,411 A 2/1962 Soper et al.
(Continued)

FOREIGN PATENT DOCUMENTS

WO WO 2005/092160 A1 10/2005
WO WO 2010/092542 * 8/2010

OTHER PUBLICATIONS

Derwent Abstract of Patent CN 2850479 published Dec. 2006.*
(Continued)

*Primary Examiner* — Anthony Weier
(74) *Attorney, Agent, or Firm* — Kenneth L. Green; Averill & Green

(57) ABSTRACT

A method for using a self-tamping brewing material holder tamps loose ground brewing material obtaining richer flavor. The brewing material holder includes a holder base and a holder lid. Brewing material is loosely deposited in the brewing material holder base and the holder lid is attached to the reusable holder base. Cooperation of the reusable holder base and holder lid biases a tamper against the brewing material to tamp the brewing material. The tamping may be biased by a spring or by a resilient solid material attached to the brewing material holder lid and push the brewing material down inside the base or may be biased by a spring or by a resilient solid material attached to the brewing material holder base and push the brewing material up against the holder lid.

18 Claims, 26 Drawing Sheets

(56) References Cited

U.S. PATENT DOCUMENTS

| | | | |
|---|---|---|---|
| 3,115,822 A | 12/1963 | Totten | |
| 3,120,170 A | 2/1964 | Garte | |
| 3,136,241 A | 6/1964 | Price | |
| 3,199,682 A | 8/1965 | Scholtz | |
| 3,224,360 A | 12/1965 | Wickenberg et al. | |
| 3,316,388 A | 4/1967 | Wickenbert et al. | |
| 3,384,004 A | 5/1968 | Perlman et al. | |
| 3,405,630 A | 10/1968 | Weber, III | |
| 3,583,308 A | 6/1971 | Williams | |
| 3,607,297 A | 9/1971 | Fasano | |
| 3,757,670 A | 9/1973 | Laama et al. | |
| 3,844,206 A | 10/1974 | Weber | |
| 3,958,502 A | 5/1976 | Vitous | |
| 4,253,385 A | 3/1981 | Illy | |
| 4,286,515 A | 9/1981 | Baumann et al. | |
| 4,603,621 A | 8/1986 | Roberts | |
| 4,703,687 A | 11/1987 | Wei | |
| 4,800,089 A | 1/1989 | Scott | |
| 4,998,463 A | 3/1991 | Precht et al. | |
| 5,000,082 A | 3/1991 | Lassota | |
| 5,012,629 A | 5/1991 | Rehman | |
| 5,046,409 A | 9/1991 | Henn | |
| 5,123,335 A | 6/1992 | Aselu | |
| 5,171,457 A | 12/1992 | Acuff et al. | |
| 5,233,914 A | 8/1993 | English | |
| 5,325,765 A | 7/1994 | Sylvan et al. | |
| 5,335,589 A | 8/1994 | Yerves et al. | |
| 5,526,733 A | 6/1996 | Klawuhn et al. | |
| 5,582,730 A | 12/1996 | Hugentobler | |
| 5,636,563 A | 6/1997 | Oppermann et al. | |
| 5,649,412 A | 7/1997 | Binacchi | |
| 5,676,041 A | 10/1997 | Glucksman et al. | |
| 5,829,340 A | 11/1998 | Yang | |
| 5,840,189 A | 11/1998 | Sylvan et al. | |
| 5,870,943 A | 2/1999 | Levi et al. | |
| 5,895,672 A | 4/1999 | Cooper | |
| 6,136,352 A | 10/2000 | Silverstein et al. | |
| 6,189,438 B1 | 2/2001 | Bielfeldt et al. | |
| D454,433 S | 3/2002 | Peter | |
| D454,434 S | 3/2002 | McDaniel et al. | |
| 6,440,256 B1 | 8/2002 | Gordon et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,708,600 B2 | 3/2004 | Winkler et al. | |
| 6,727,484 B2 | 4/2004 | Policappelli | |
| 6,740,345 B2 | 5/2004 | Cai | |
| 6,748,850 B1 * | 6/2004 | Kraan | 99/289 R |
| 6,777,007 B2 | 8/2004 | Cai | |
| 6,832,542 B2 | 12/2004 | Hu et al. | |
| 6,843,165 B2 | 1/2005 | Stoner et al. | |
| D502,362 S | 3/2005 | Lazaris et al. | |
| 6,904,840 B1 | 6/2005 | Pfeifer et al. | |
| 6,948,420 B2 | 9/2005 | Kirschner et al. | |
| 7,047,870 B2 | 5/2006 | Gantt et al. | |
| 7,081,263 B2 | 7/2006 | Albrecht | |
| 7,131,369 B2 | 11/2006 | Gantt et al. | |
| 7,320,274 B2 | 1/2008 | Castellani | |
| 7,377,089 B2 | 5/2008 | Rapparini | |
| 7,461,587 B2 * | 12/2008 | Guerrero | 99/323 |
| 7,946,217 B2 | 5/2011 | Favre et al. | |
| 8,047,127 B2 | 11/2011 | Lin | |
| 8,291,812 B2 * | 10/2012 | Rivera | 99/286 |
| 8,327,754 B2 * | 12/2012 | Kirschner et al. | 99/295 |
| 8,794,125 B1 * | 8/2014 | Rivera | 99/295 |
| 2002/0035929 A1 | 3/2002 | Kanba et al. | |
| 2002/0148356 A1 | 10/2002 | Lazaris et al. | |
| 2003/0200872 A1 | 10/2003 | Lin | |
| 2004/0005384 A1 | 1/2004 | Cai | |
| 2004/0118290 A1 | 6/2004 | Cai | |
| 2005/0236323 A1 | 10/2005 | Oliver et al. | |
| 2005/0257695 A1 | 11/2005 | Dobranski et al. | |
| 2006/0159815 A1 | 7/2006 | Crook et al. | |
| 2006/0174769 A1 | 8/2006 | Favre et al. | |
| 2006/0196364 A1 | 9/2006 | Kirschner | |
| 2007/0259074 A1 | 11/2007 | Searchilli et al. | |
| 2009/0229471 A1 | 9/2009 | Lun et al. | |
| 2010/0083843 A1 | 4/2010 | Denisart et al. | |
| 2011/0100228 A1 * | 5/2011 | Rivera | 99/281 |
| 2011/0100229 A1 * | 5/2011 | Rivera | 99/287 |
| 2011/0113969 A1 * | 5/2011 | Rivera | 99/287 |
| 2011/0117248 A1 * | 5/2011 | Rivera | 426/77 |
| 2011/0209623 A1 * | 9/2011 | Leung et al. | 99/287 |
| 2011/0274802 A1 | 11/2011 | Rivera | |
| 2012/0207895 A1 | 8/2012 | Rivera | |
| 2012/0207896 A1 | 8/2012 | Rivera | |
| 2012/0276264 A1 | 11/2012 | Rivera | |
| 2012/0285330 A1 * | 11/2012 | Demiglio et al. | 99/279 |
| 2012/0285334 A1 * | 11/2012 | DeMiglio et al. | 99/300 |
| 2013/0061764 A1 * | 3/2013 | Rivera | 99/300 |
| 2014/0245895 A1 * | 9/2014 | DeMiglio et al. | 99/323 |

OTHER PUBLICATIONS

English Translation of Patent CN 2850479 published Dec. 2006.*

* cited by examiner

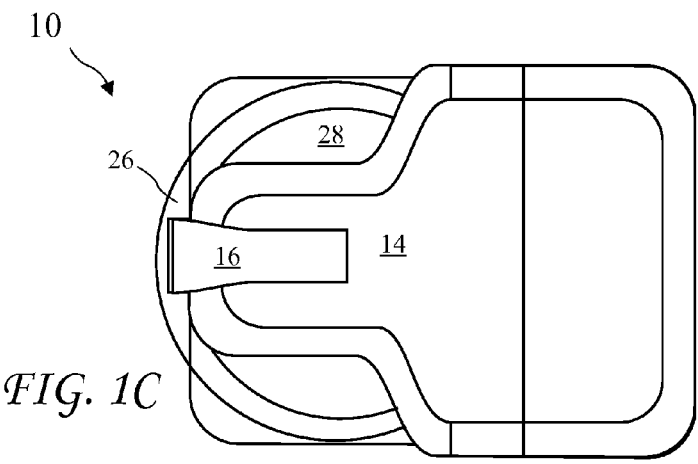
FIG. 1C
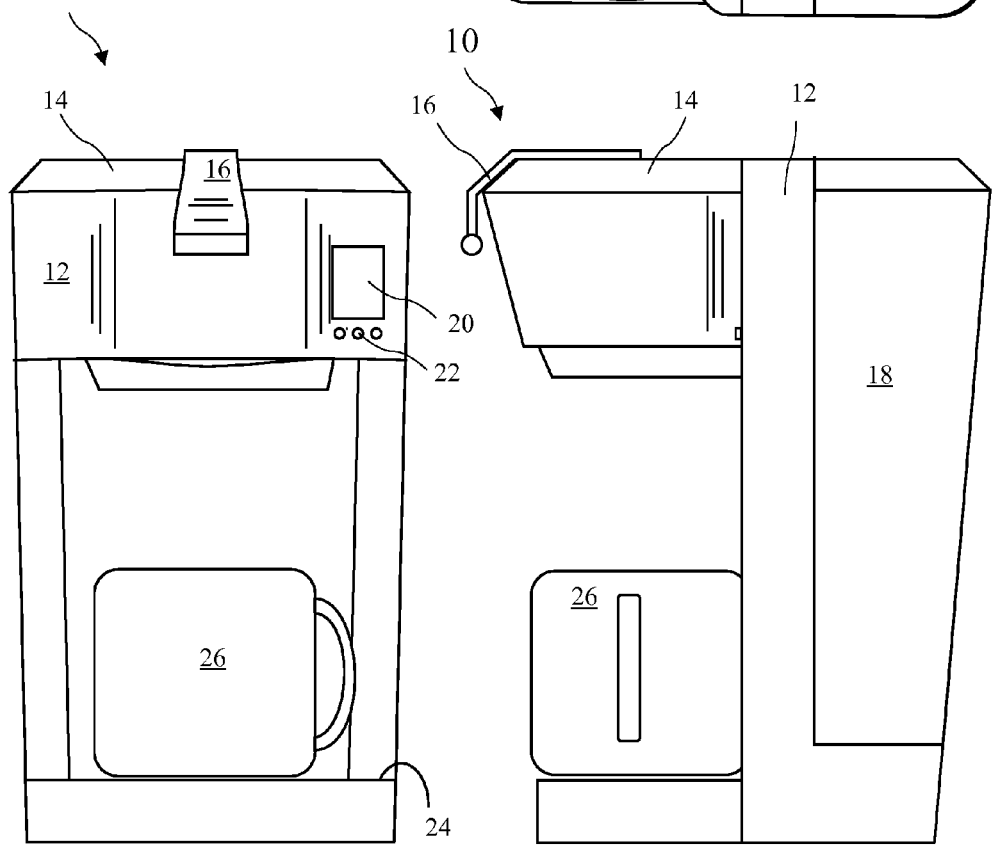
FIG. 1A
FIG. 1B

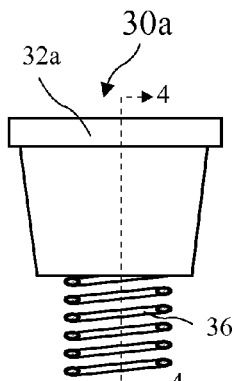
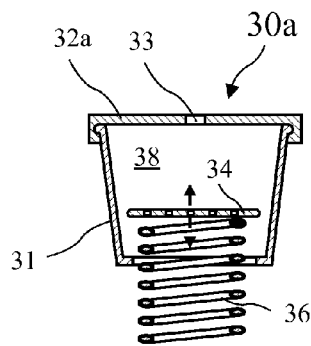
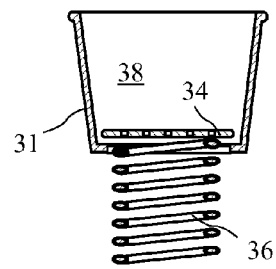
FIG. 3   FIG. 4   FIG. 5A
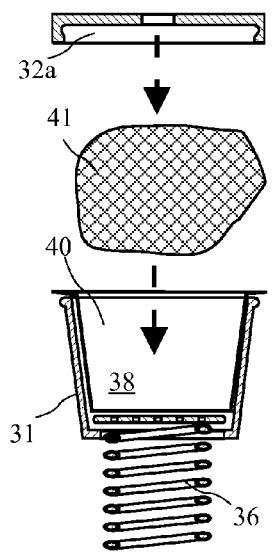
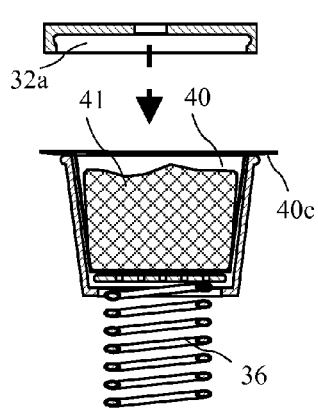
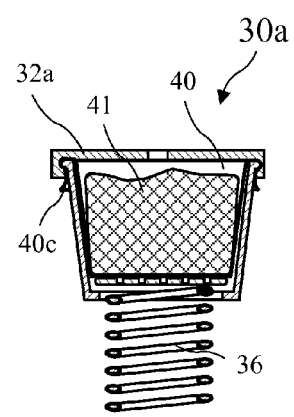
FIG. 5B   FIG. 5C   FIG. 5D
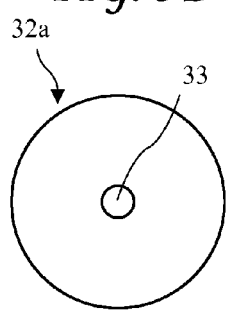
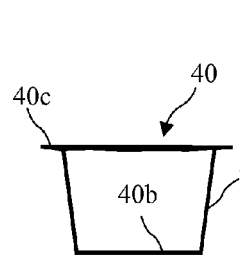
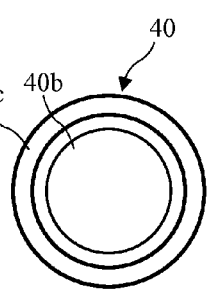
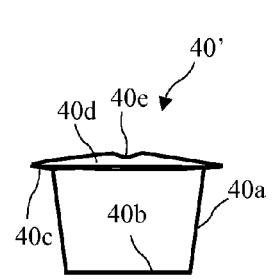
FIG. 6   FIG. 7A   FIG. 7B   FIG. 7C

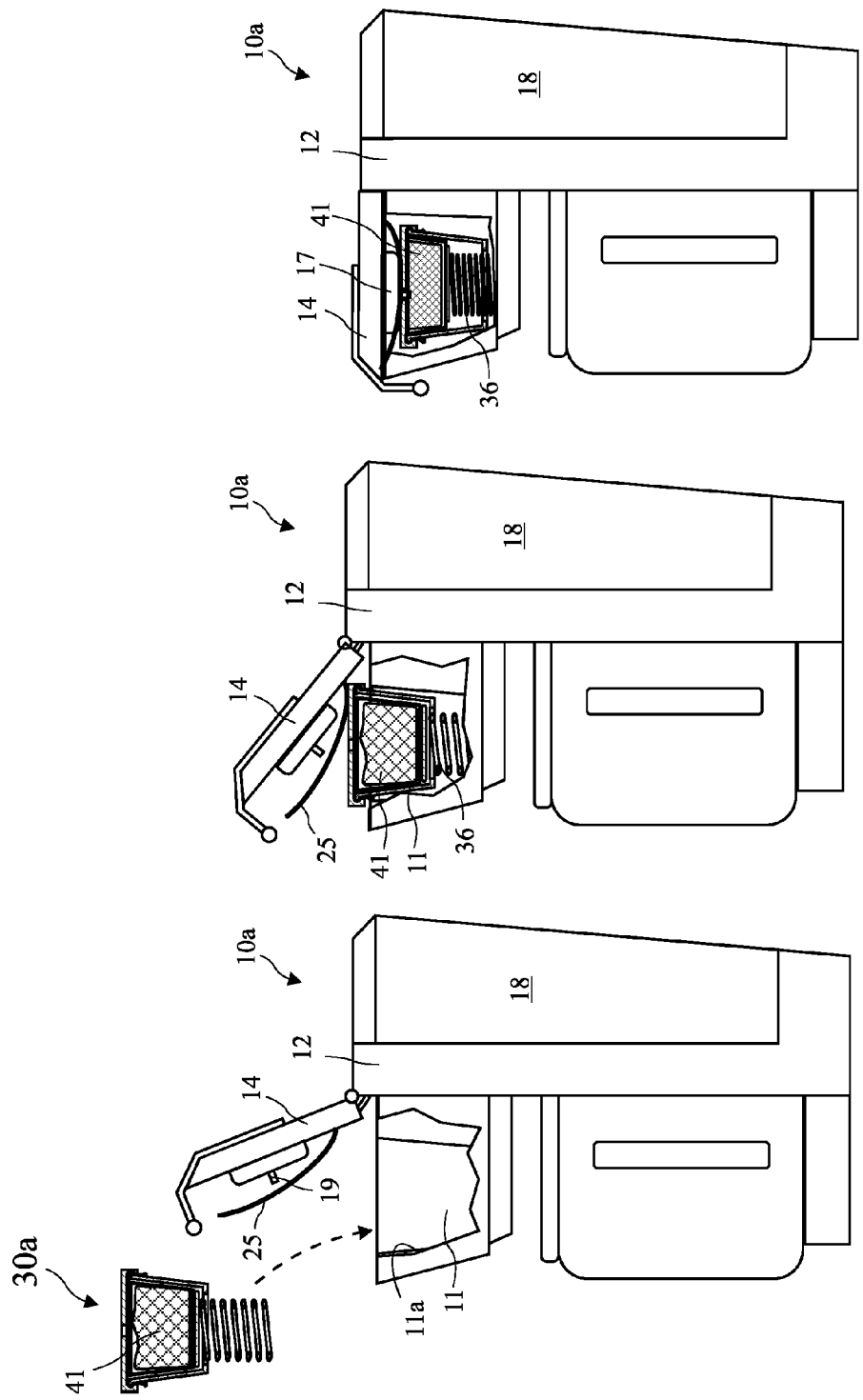

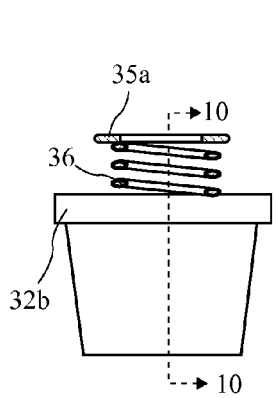
FIG. 9
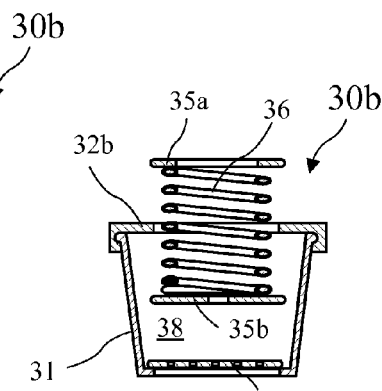
FIG. 10
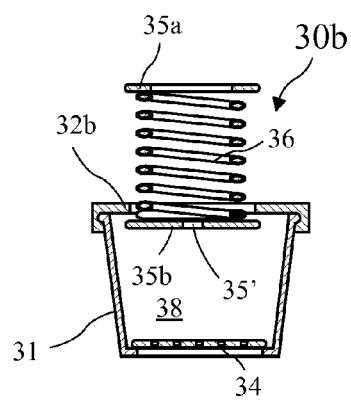
FIG. 11A
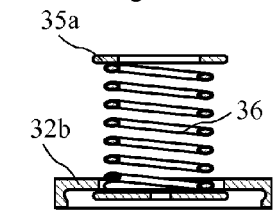
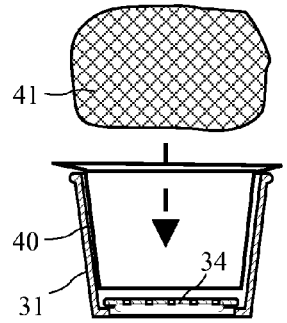
FIG. 11B
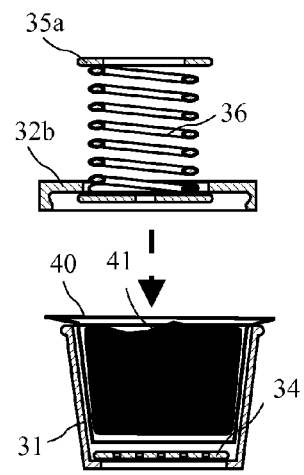
FIG. 11C
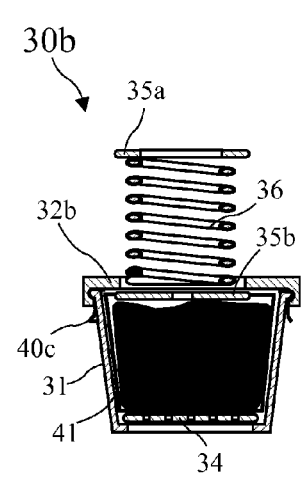
FIG. 11D
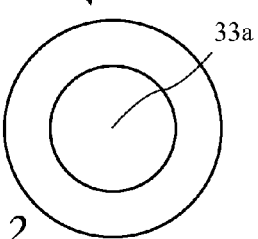
FIG. 12
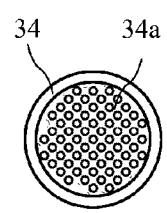
FIG. 13

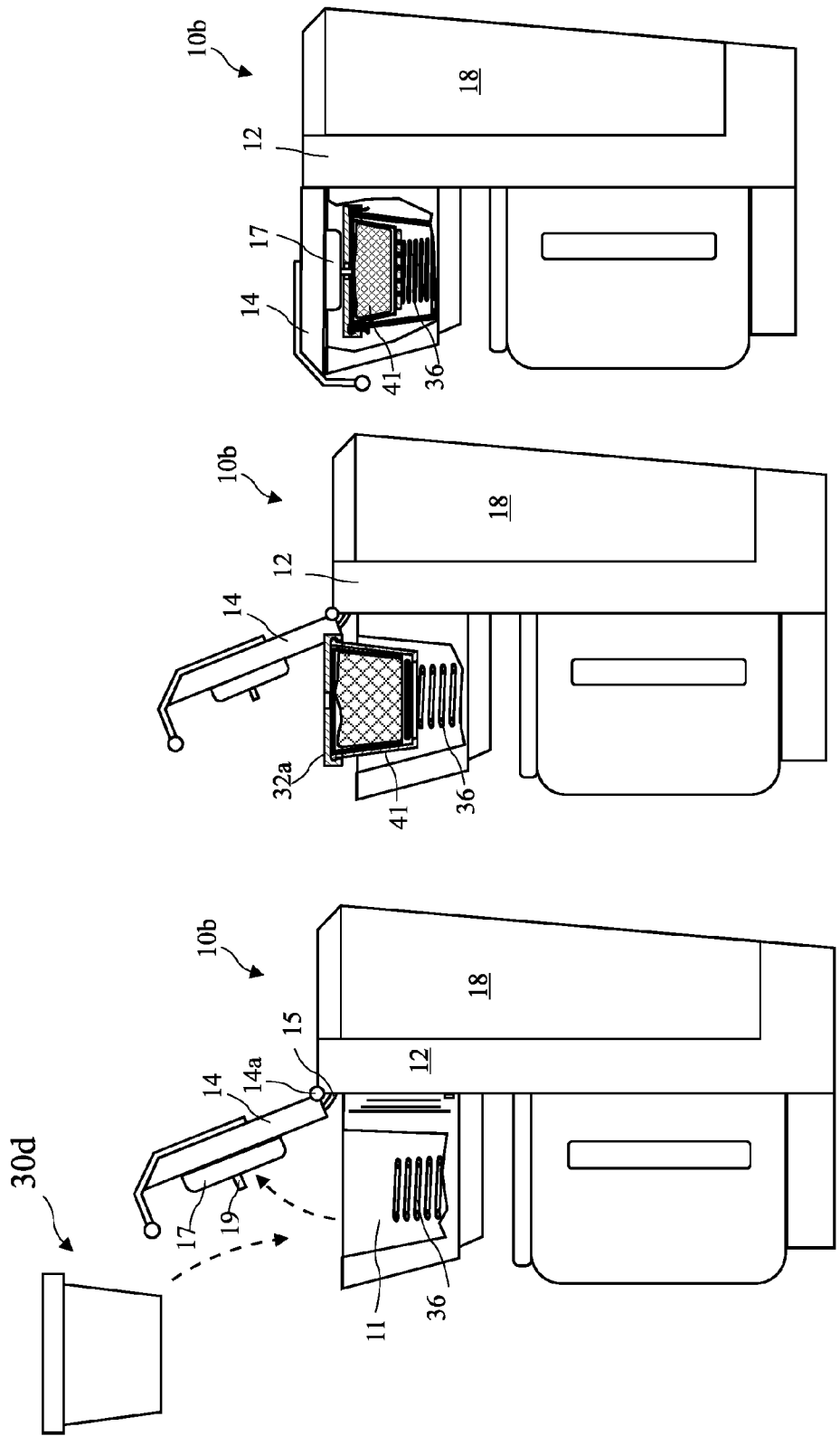

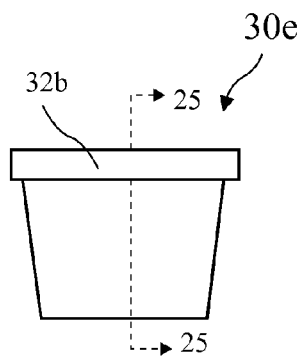
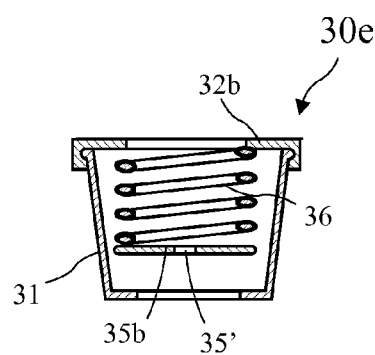
FIG. 24  FIG. 25
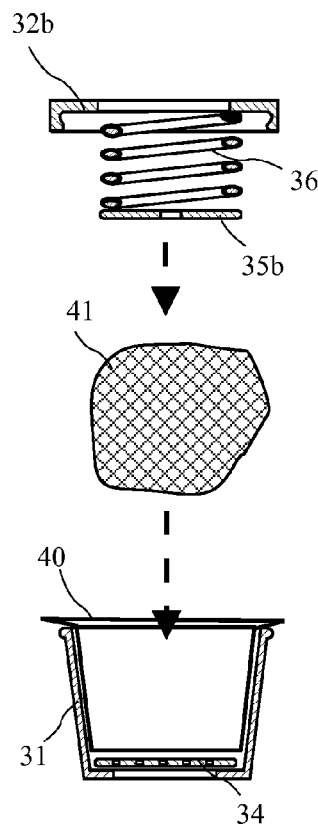
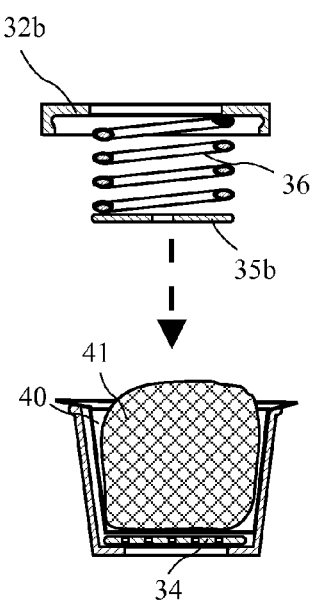
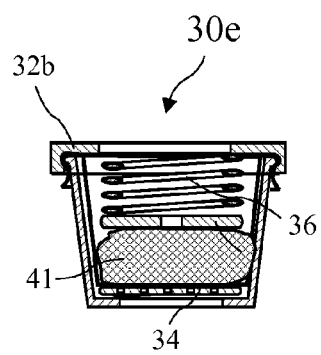
FIG. 26A  FIG. 26B  FIG. 26C

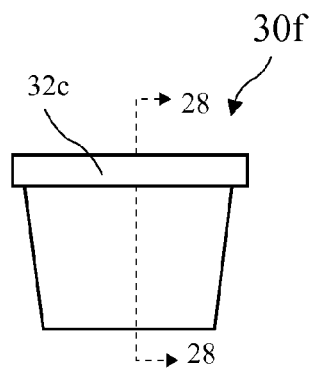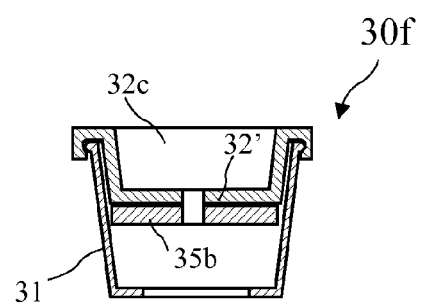
FIG. 27     FIG. 28
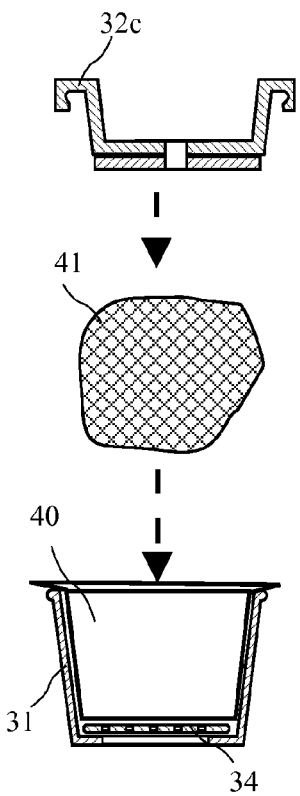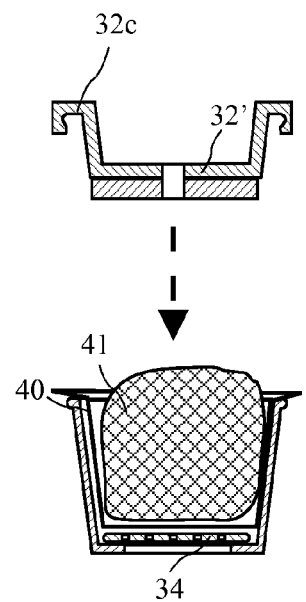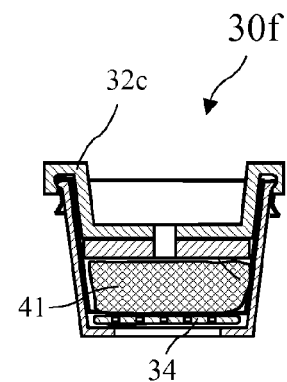
FIG. 29A     FIG. 29B     FIG. 29C

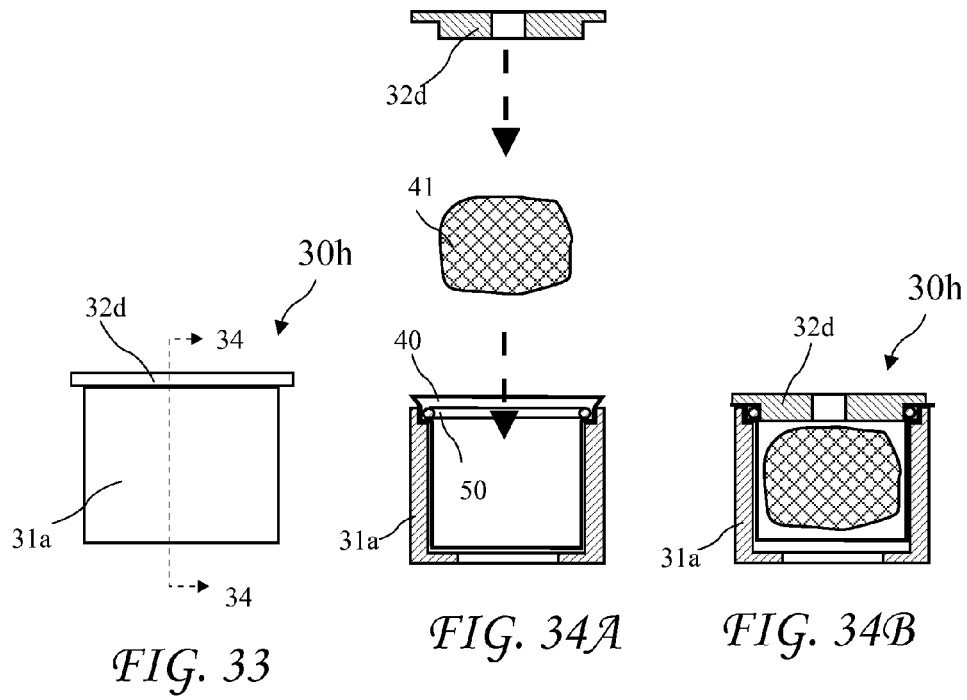
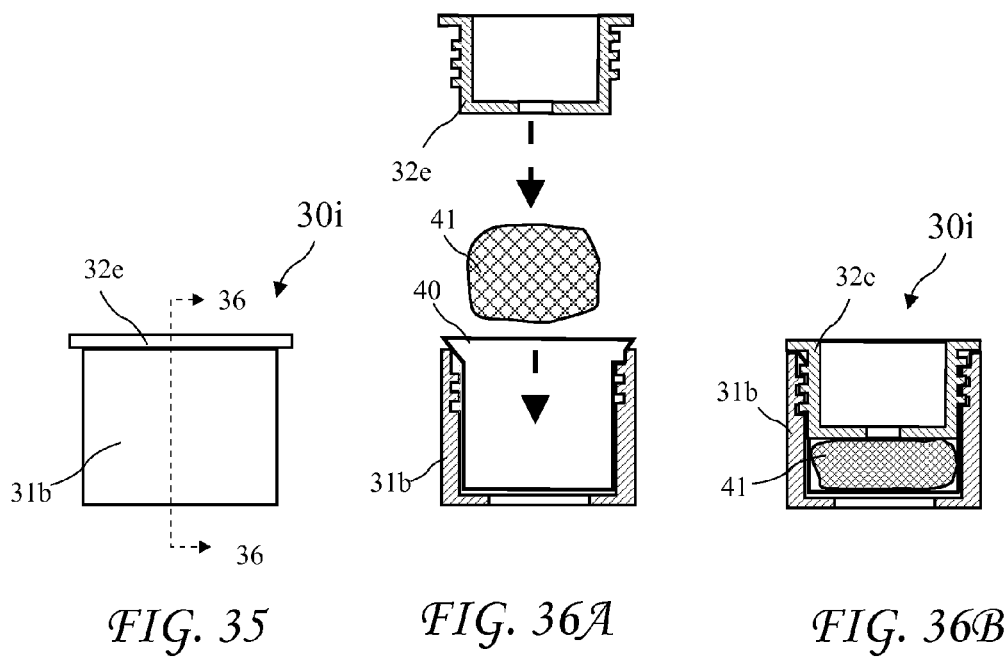
FIG. 33   FIG. 34A   FIG. 34B
FIG. 35   FIG. 36A   FIG. 36B

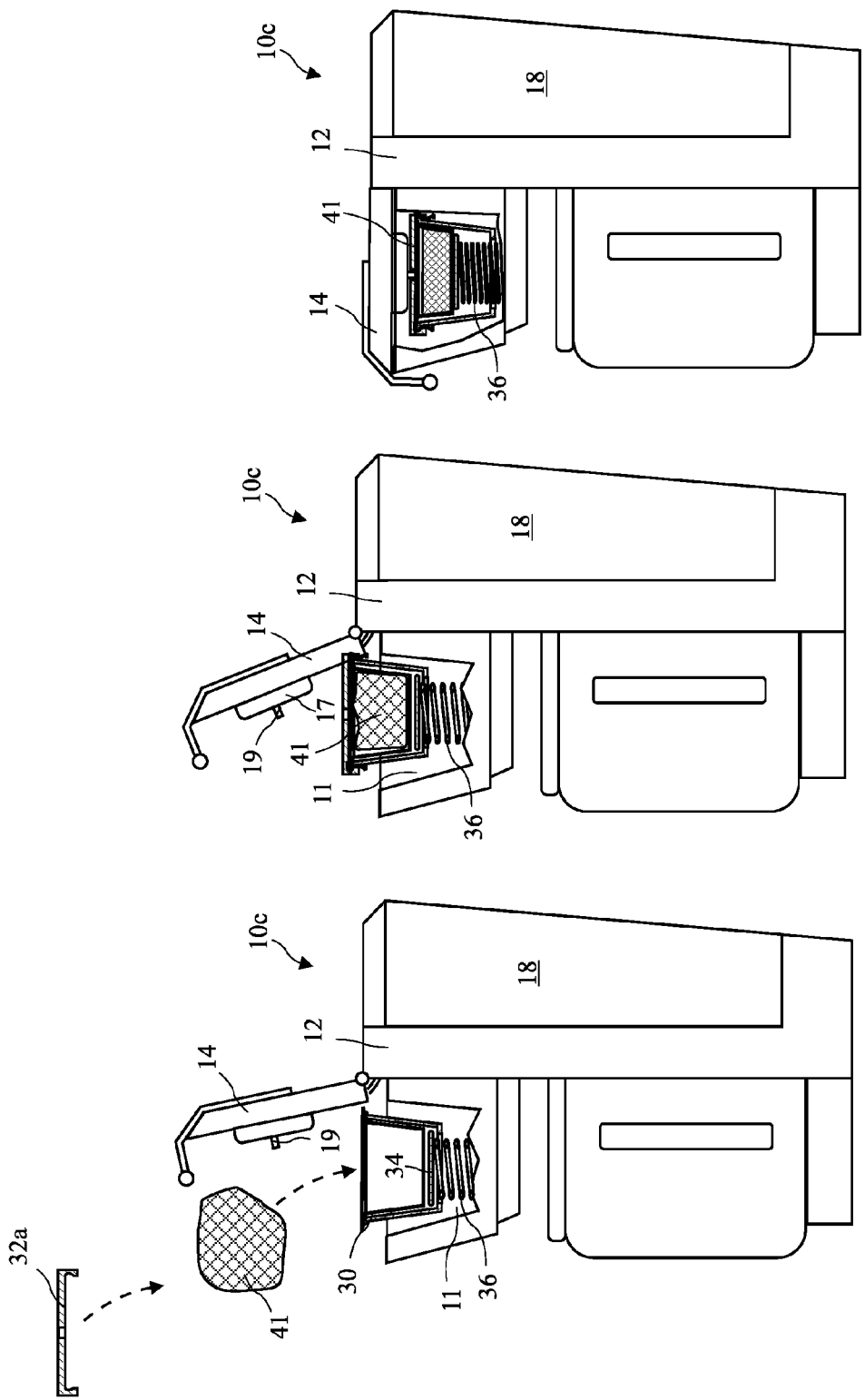

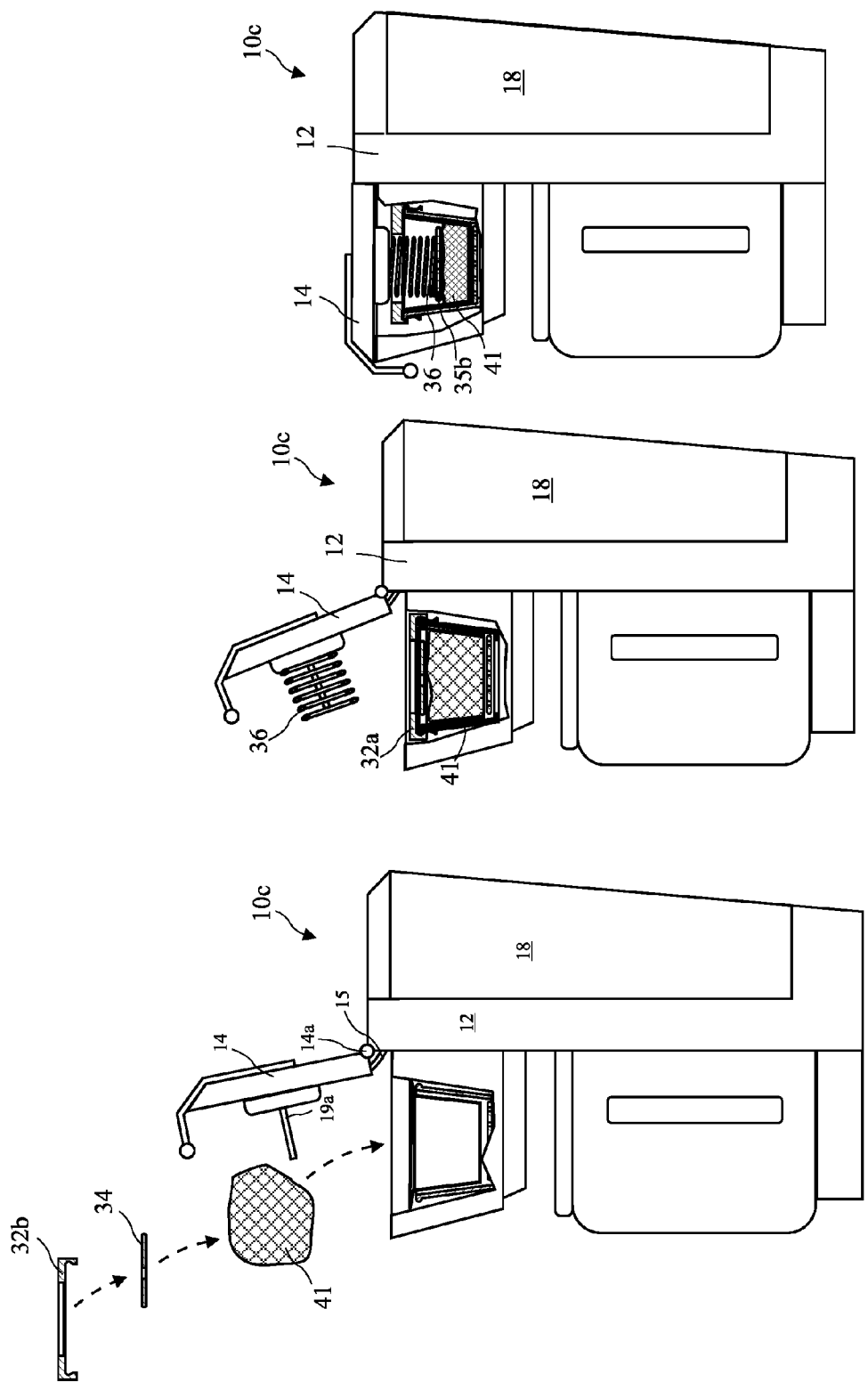

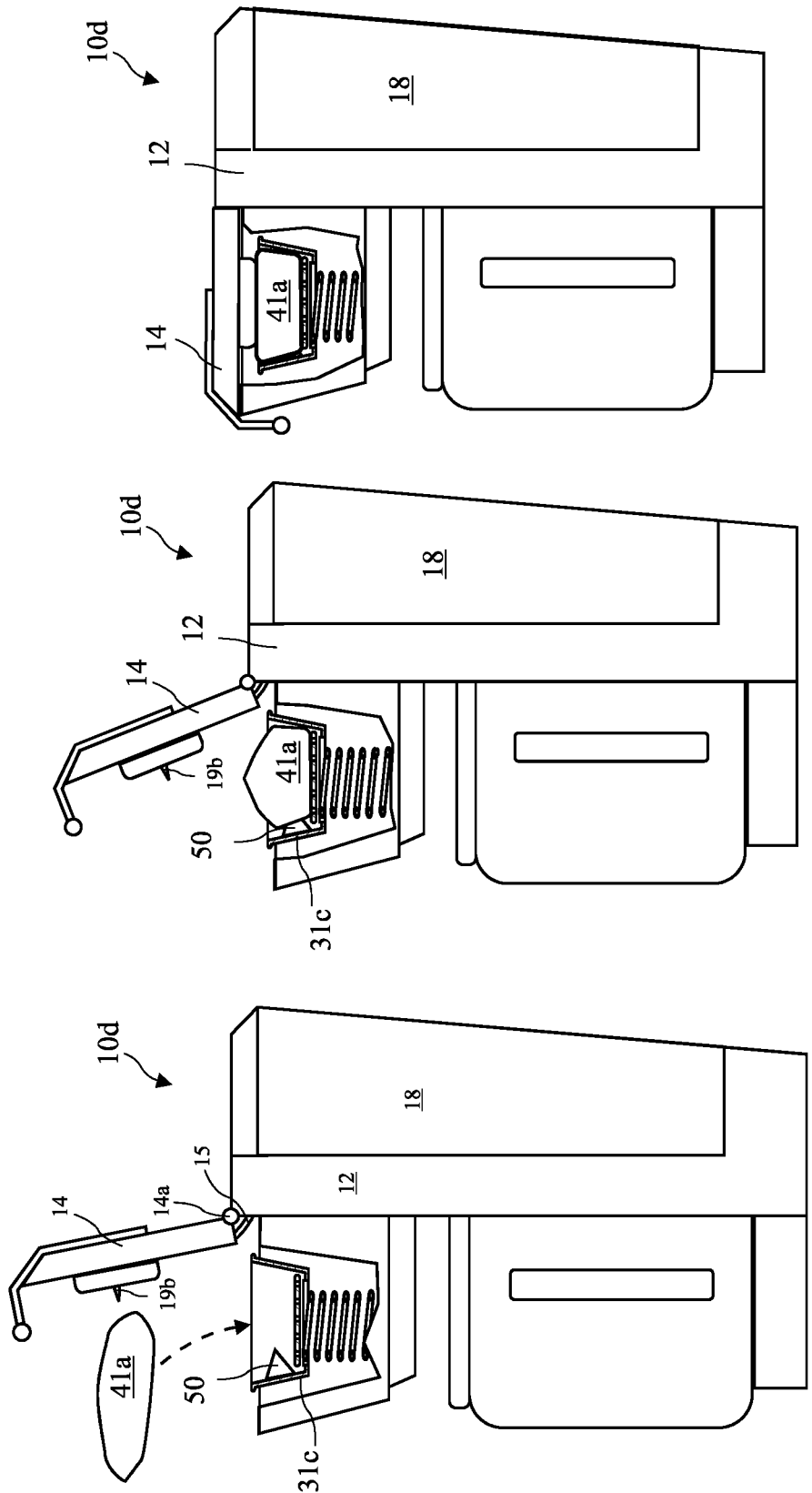

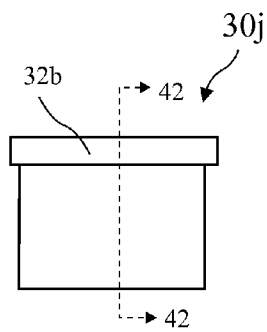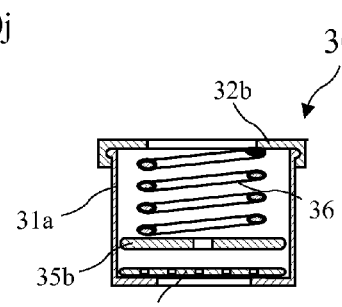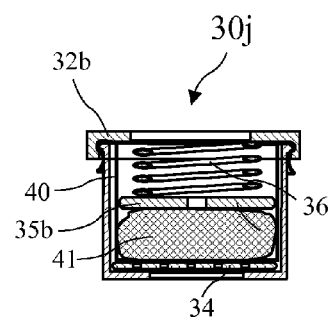
FIG. 41  FIG. 42  FIG. 43
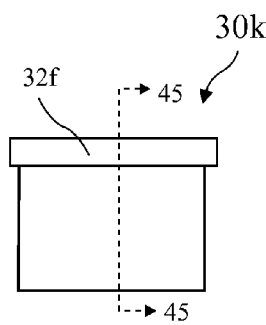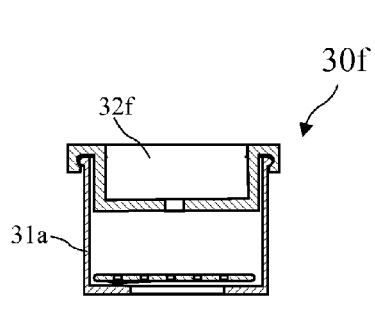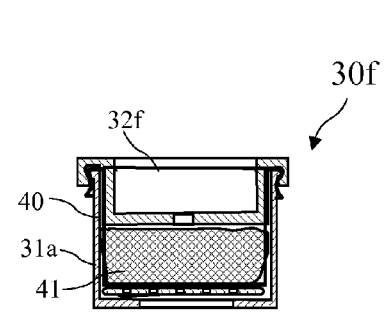
FIG. 44  FIG. 45  FIG. 46
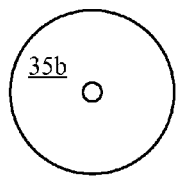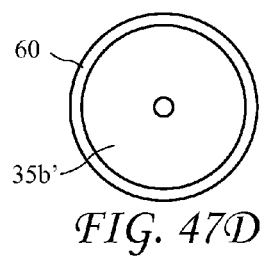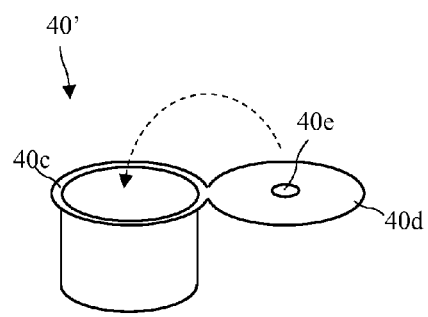
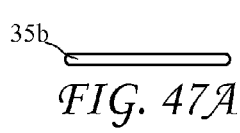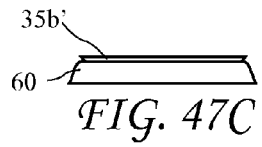
FIG. 47A  FIG. 47B  FIG. 47C  FIG. 47D  FIG. 48

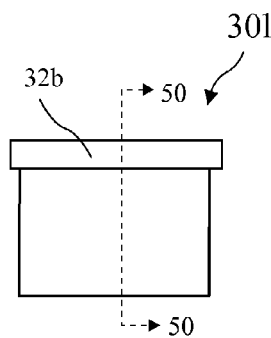
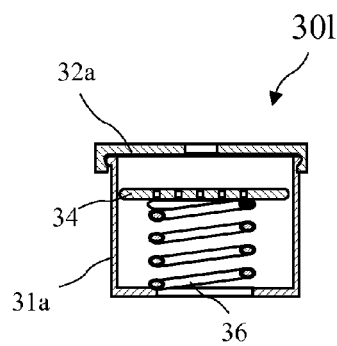
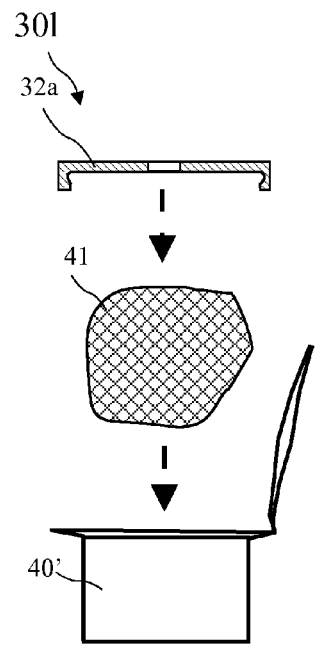
FIG. 49          FIG. 50          FIG. 51A
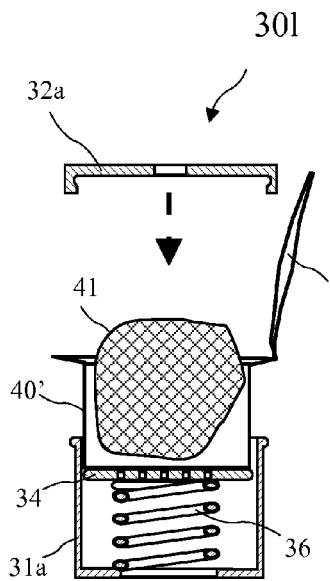
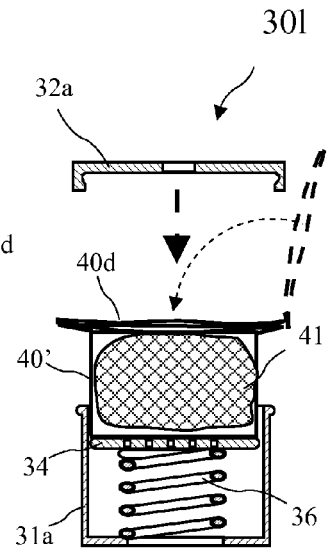
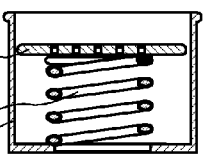
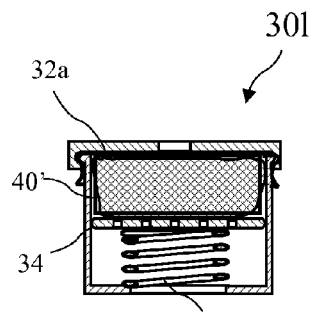
FIG. 51B          FIG. 51C          FIG. 51D

METHOD FOR TAMPING BREWING MATERIAL USING A SELF TAMPING SINGLE SERVING BREWING MATERIAL HOLDER

The present application is a Continuation In Part of:
U.S. patent application Ser. No. 11/777,831 filed Jul. 13, 2007; and
U.S. patent application Ser. No. 12/610,181 filed Oct. 30, 2009; and
U.S. patent application Ser. No. 12/620,584 filed Nov. 17, 2009; and
U.S. patent application Ser. No. 12/762,262 filed Apr. 16, 2010,
which applications are incorporated in their entirety herein by reference.

BACKGROUND OF THE INVENTION

The present invention relates to coffee makers and in particular to a method for using a brewing material holder which tamps brewing material.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 11/777,831 filed Jul. 13, 2007 for "Pod Adapter System for Single Service Beverage Brewers" by the present applicant overcomes this problem by packaging the coffee in closed filter paper commonly called a pod, and inserting the closed pod into a pod holder including a tamping spring and bottom tamper for tamping the pod between the bottom tamper and a coffee holder lid. While the pod adapter of the '831 application works well for some applications, it does not facilitate the simple use of bulk ground coffee in all general coffee makers.

BRIEF SUMMARY OF THE INVENTION

The present invention addresses the above and other needs by providing a method for using a self-tamping brewing material holder which tamps loose ground brewing material obtaining richer flavor. The brewing material holder includes a holder base and a holder lid. Brewing material is loosely deposited in the reusable holder base and the holder lid is attached to the reusable holder base. Cooperation of the reusable holder base and holder lid biases a tam per against the brewing material to tamp the brewing material. The tamping may be biased by a spring, or by a resilient solid material, attached to the holder lid and push the brewing material down inside the base or may be biased by a spring or by a resilient solid material attached to the reusable holder base and push the brewing material up against the holder lid.

In accordance with one aspect of the invention, there is provided a coffee making system for tamping coffee. The holder receives a portion of untamped brewing material and a holder lid closes the holder after receiving the untamped brewing material. A tamper resides inside the brewing material holder and tamps the coffee as the holder lid is closed. After tamping, the brewing material holder is places into a suitable coffee maker. A hot water nozzle is attached to the coffee maker for providing a flow of hot water under pressure to the tamped brewing material to make a coffee drink.

In accordance with another aspect of the invention, there is provided a method for tamping brewing material. The method includes detaching a reusable holder lid from a reusable holder base, placing a single serving of brewing material into an open top of the reusable holder base, aligning the reusable holder lid with the open top of the reusable holder base, moving the reusable holder lid towards the open top of the reusable holder base, wherein the moving the reusable holder lid towards the open top of the reusable holder base urges a tamper member of the brewing material holder and the single serving of brewing material together, attaching the reusable holder lid to the open top of the reusable holder base, engaging the reusable brewing material holder with a coffee maker including a coffee maker pump, and the coffee maker pump pumping liquid into the reusable brewing material holder to prepare a serving of brewed drink.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 3 is a side view of a first brewing material holder according to the present invention.

FIG. 4 is a cross-sectional side view of the first brewing material holder according to the present invention taken along line 4-4 of FIG. 3.

FIG. 5A is a cross-sectional side view of the first brewing material holder according to the present invention taken along line 4-4 of FIG. 3 showing an empty brewing material holder with the tamping spring and the bottom tamper according to the present invention.

FIG. 5B is a cross-sectional side view of the first brewing material holder according to the present invention taken along line 4-4 of FIG. 3 showing the brewing material holder with the tamping spring and bottom tamper, a portion of brewing material, and the holder lid ready to attach to a holder base according to the present invention.

FIG. 5C is a cross-sectional side view of the first brewing material holder according to the present invention taken along line 4-4 of FIG. 3 showing the brewing material holder with the tamping spring and bottom tamper, the portion of brewing material in the brewing material holder, and the holder lid ready to attach to the reusable holder base according to the present invention.

FIG. 5D is a cross-sectional side view of the first brewing material holder according to the present invention taken along line 4-4 of FIG. 3 showing the brewing material holder with the tamping spring and bottom tamper, the portion of brewing material in the brewing material holder, and the holder lid attached to the brewing material holder base, according to the present invention.

FIG. 6 is a top view of the first holder lid.

FIG. 7A is a side view of a filter paper cup according to the present invention.

FIG. 7B is a top view of the filter paper cup according to the present invention.

FIG. 7C is a second embodiment of the filter paper cup with a lid.

FIG. 8A shows the first brewing material holder ready for insertion into the coffee maker.

FIG. 8B shows the first brewing material holder inserted into the coffee maker before tamping the coffee.

FIG. 8C shows the first brewing material holder inserted into the coffee maker after tamping the coffee.

FIG. 9 is a side view of a second brewing material holder according to the present invention.

FIG. 10 is a cross-sectional side view of the second brewing material holder according to the present invention taken along line 10-10 of FIG. 9.

FIG. 11A is a cross-sectional side view of the second brewing material holder according to the present invention taken along line 10-10 of FIG. 9 showing an empty brewing material holder with the tamping spring and the top tamper according to the present invention.

FIG. 11B is a cross-sectional side view of the second brewing material holder according to the present invention taken along line 10-10 of FIG. 9 showing the brewing material holder with the holder lid, tamping spring and top tamper, and a portion of brewing material, ready to attach according to the present invention.

FIG. 11C is a cross-sectional side view of the second brewing material holder according to the present invention taken along line 10-10 of FIG. 9 showing the portion of untamped brewing material in the brewing material holder, and the holder lid, tamping spring and top tamper, ready to attach to the reusable holder base, according to the present invention.

FIG. 11D is a cross-sectional side view of the second brewing material holder according to the present invention taken along line 10-10 of FIG. 9 showing the portion of brewing material in the brewing material holder and the tamping spring, top tamper, and the holder lid attached to the brewing material holder, according to the present invention.

FIG. 12 is a top view of the second holder lid.

FIG. 13 is a top view of the bottom tamper.

FIG. 22A shows the fourth brewing material holder ready for insertion into the coffee maker.

FIG. 22B shows the fourth brewing material holder inserted into the coffee maker before tamping the coffee.

FIG. 22C shows the fourth brewing material holder inserted into the coffee maker after tamping the coffee.

FIG. 24 is a side view of a fifth brewing material holder according to the present invention.

FIG. 25 is a cross-sectional side view of the fifth brewing material holder according to the present invention taken along line 25-25 of FIG. 24.

FIG. 26A is a cross-sectional side view of the fifth brewing material holder according to the present invention taken along line 25-25 of FIG. 24 showing the portion of brewing material above the brewing material holder base, and the holder lid with the top tamper and tamping spring, ready to attach to the brewing material holder base, according to the present invention.

FIG. 26B is a cross-sectional side view of the fifth brewing material holder according to the present invention taken along line 25-25 of FIG. 24 showing the brewing material holder with the portion of brewing material in the brewing material holder, and the holder lid with the top tamper and tamping spring ready to attach to the brewing material holder base, according to the present invention.

FIG. 26C is a cross-sectional side view of the fifth brewing material holder according to the present invention taken along line 25-25 of FIG. 24 showing the portion of brewing material in the brewing material holder, and the holder lid with the top tamper and tamping spring attached to the reusable holder base, according to the present invention.

FIG. 27 is a side view of a sixth brewing material holder according to the present invention.

FIG. 28 is a cross-sectional side view of the sixth brewing material holder according to the present invention taken along line 28-28 of FIG. 27.

FIG. 29A is a cross-sectional side view of the sixth brewing material holder according to the present invention taken along line 28-28 of FIG. 27 showing the portion of brewing material above the brewing material holder, and the holder lid ready to attach to the reusable holder base, according to the present invention.

FIG. 29B is a cross-sectional side view of the sixth brewing material holder according to the present invention taken along line 28-28 of FIG. 27 showing the portion of brewing material in the brewing material holder, and the holder lid ready to attach to the reusable holder base, according to the present invention.

FIG. 29C is a cross-sectional side view of the sixth brewing material holder according to the present invention taken along line 28-28 of FIG. 27 showing the portion of brewing material in the brewing material holder, and the holder lid attached and tam ping the coffee, according to the present invention.

FIG. 33 is a side view of an eighth brewing material holder according to the present invention.

FIG. 34A is a cross-sectional side view of the eighth brewing material holder taken along line 34-34 of FIG. 33 showing a portion of brewing material for placing inside the brewing material holder and the holder lid with an insertable portion and an O-Ring inside the brewing material holder for sealing according to the present invention.

FIG. 34B is a cross-sectional side view of the eighth brewing material holder taken along line 34-34 of FIG. 33 showing the portion of brewing material inside the brewing material holder and the holder lid with the insertable portion inserted into the brewing material holder and cooperating with the O-Ring inside the brewing material holder for sealing.

FIG. 35 is a side view of a ninth brewing material holder according to the present invention.

FIG. 36A is a cross-sectional side view of the ninth brewing material holder taken along line 36-36 of FIG. 35 showing a portion of brewing material for placing inside the brewing material holder and a holder lid with a threaded portion for screwing inside the reusable holder base for sealing according to the present invention.

FIG. 36B is a cross-sectional side view of the ninth brewing material holder taken along line 36-36 of FIG. 35 showing the portion of brewing material inside the brewing material holder and a holder lid with the threaded portion screwed into the reusable holder base and tam ping the coffee according to the present invention.

FIG. 37A shows a third coffee maker having a brewing material holder for receiving a portion of brewing material and tamping spring according to the present invention for tamping the coffee when the coffee maker lid is closed.

FIG. 37B shows the third coffee maker with the brewing material holder holding the portion of brewing material and the tamping spring under the brewing material holder according to the present invention for tamping the coffee when the coffee maker lid is closed.

FIG. 37C shows the third coffee maker with the brewing material holder holding the portion of tamped brewing material with the coffee maker lid closed for tamping the coffee according to the present invention.

FIG. 38A shows a third coffee maker having a brewing material holder for receiving a portion of brewing material and tamping spring attached to the coffee maker lid according to the present invention for tamping the coffee when the coffee maker lid is closed.

FIG. 38B shows the third coffee maker with the brewing material holder holding the portion of untamped brewing material according to the present invention for tamping the coffee when the coffee maker lid is closed.

FIG. 38C shows the third coffee maker with the brewing material holder holding the portion of tamped brewing material with the coffee maker lid closed to push the tamping spring into the brewing material holder for tamping the coffee according to the present invention.

FIG. 39A shows a fourth coffee maker having a brewing material holder for receiving a packet containing untamped brewing material, a knife for cutting the packet open, and tamping spring attached to the coffee maker lid according to the present invention for tamping the coffee when the coffee maker lid is closed.

FIG. 39B shows the fourth coffee maker with the brewing material holder holding the packet of untamped brewing material according to the present invention for tamping the coffee when the coffee maker lid is closed.

FIG. 39C shows the fourth coffee maker with the brewing material holder holding the packet of tamped brewing material with the coffee maker lid closed to push the tamping spring into the brewing material holder for tamping the coffee according to the present invention.

FIG. 41 is a side view of a tenth brewing material holder with straight walls according to the present invention.

FIG. 42 is a cross-sectional view of the tenth brewing material holder taken along line 42-42 of FIG. 41 showing an empty brewing material holder.

FIG. 43 is a cross-sectional view of the tenth brewing material holder taken along line 42-42 of FIG. 41 showing a full and tamped brewing material holder.

FIG. 44 is a side view of an eleventh brewing material holder with straight walls according to the present invention.

FIG. 45 is a cross-sectional view of the eleventh brewing material holder taken along line 45-45 of FIG. 44 showing an empty brewing material holder.

FIG. 46 is a cross-sectional view of the eleventh brewing material holder taken along line 45-45 of FIG. 41 showing a full and tamped brewing material holder.

FIG. 47A is a side view of a top tamper.

FIG. 47B is a top view of the top tamper.

FIG. 47C is a side view of a top tamper with a seal according to the present invention.

FIG. 47D is a top view of the top tamper with a seal.

FIG. 48 is a perspective view of a filter paper cup with a folding cup lid.

FIG. 49 is a side view of an twelfth brewing material holder with straight walls according to the present invention.

FIG. 50 is a cross-sectional view of the twelfth brewing material holder taken along line 50-50 of FIG. 49 showing an empty brewing material holder.

FIG. 51A is a cross-sectional view of the twelfth brewing material holder taken along line 50-50 of FIG. 49 showing a lid, coffee, a filter paper cup, above the base, and the brewing material holder base.

FIG. 51B is a cross-sectional view of the twelfth brewing material holder taken along line 50-50 of FIG. 49 showing the lid, above the coffee and the filter paper cup resting in the brewing material holder base.

FIG. 51C is a cross-sectional view of the twelfth brewing material holder taken along line 50-50 of FIG. 49 showing the lid, above the coffee and the filter paper cup resting in the brewing material holder base with a filter paper cover folded over the coffee in the filter paper cup.

FIG. 51D is a cross-sectional view of the twelfth brewing material holder taken along line 50-50 of FIG. 49 showing the lid attached to the base with the coffee and the filter paper cup residing in the brewing material holder base with the coffee tamped.

FIG. 63A is a side view of a filter cup according to the present invention.

FIG. 63B is a top view of the filter cup according to the present invention.

Corresponding reference characters indicate corresponding components throughout the several views of the drawings.

FIG. 64 shows a brewing material holder with a second embodiment of a lid.

FIG. 65 shows a method according to the present invention.

DETAILED DESCRIPTION OF THE INVENTION

Figure 2A:
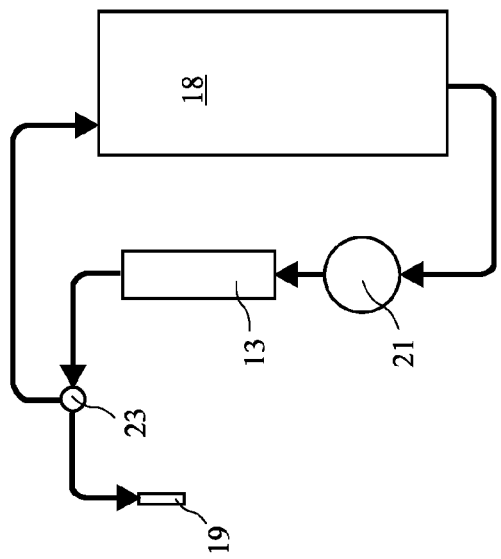
FIG. 2A is a functional diagram of the coffee maker.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a base 12, an opening lid 14, a lid handle 16, a water container 18, a display 20, controls 22, and platform 24. A cup 26 rests on the platform 24. The coffee maker 10 provides a flow of hot water through brewing material to produce a brewed drink. The flow of water may be heated by one of any known means, for example, an electrical heating coil, inductive heating, or a conductive coating on tubing carrying the water.

Figure 2:
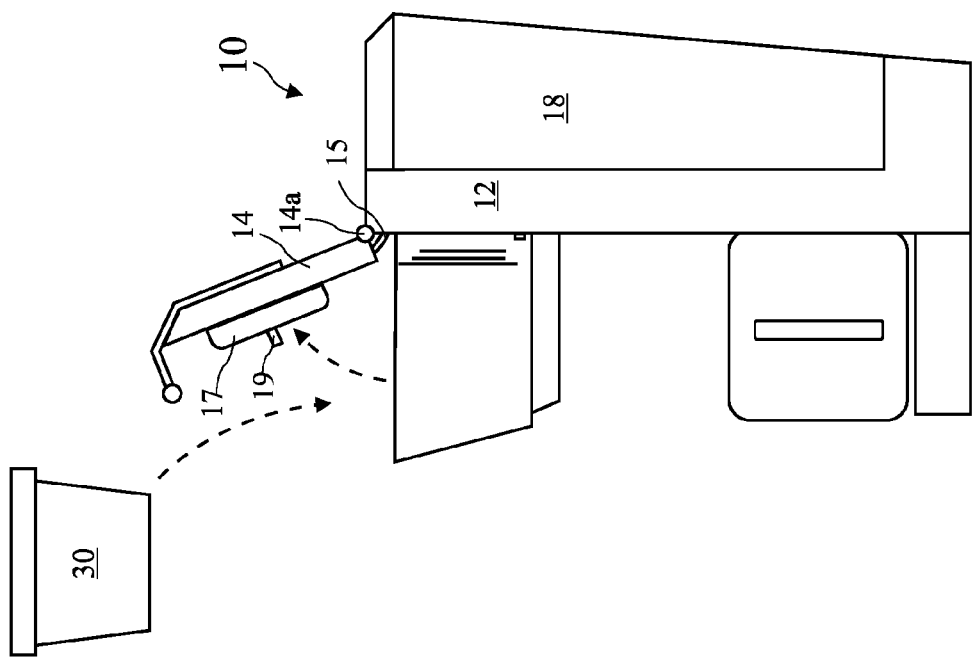
FIG. 2 is a side view of the coffee maker with an open lid allowing placement of a brewing material holder according to the present invention inside the coffee maker.

A side view of the coffee maker 10 with an open lid 14 allowing placement of a brewing material holder 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the brewing material holder 30 when the lid 14 is closed, and in cooperation with other means discloses hereafter, tamps coffee contained in the brewing material holder 30. A nozzle 19 extending down from the closed lid 14 directs the flow of hot water into the brewing material holder 30.

A functional diagram of the coffee maker 10 is shown in FIG. 2A. The preferred coffee (or brewing material) maker 10 includes the water tank 18, water pump 21, a heater 13, check valve 23 and the nozzle 18. The pump 21 preferably provides at least one PSI water pressure. The water heater 13 may include a heating coil, inductive heating, or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include placing the water in the water tank 18 under pressure, and a coffee maker using any means to provide a forced flow of water is intending to within the scope of the present invention.

A side view of a first brewing material holder 30a according to the present invention is shown in FIG. 3 and a cross-sectional side view of the first brewing material holder 30a including a holder base 31, a first holder lid 32a, a bottom tamper 34, and a tamping spring 36 according to the present invention taken along line 4-4 of FIG. 3 is shown in FIG. 4. A volume (or brewing material holder interior) 38 is provided inside the brewing material holder 30a to receive brewing material 41. A passage 33 in the lid 32a is provided for the nozzle 19 (see FIG. 2).

A cross-sectional side view of the first brewing material holder 30a taken along line 4-4 of FIG. 3 showing an empty brewing material holder 30a with the tamping spring 36 and the bottom tamper 34 ready for filling are shown in FIG. 5A. A cross-sectional side view of the first brewing material holder 30a taken along line 4-4 of FIG. 3 showing the brewing material holder 30a with the tamping spring 36 and bottom tamper 34, a portion of brewing material 41, and the holder lid 32a ready to attach is shown in FIG. 5B. A cross-sectional side view of the first brewing material holder 30a taken along line 4-4 of FIG. 3 showing the brewing material holder 30a with the tamping spring 36 and bottom tamper 34, a portion of brewing material in the volume 38, and the holder lid 32a ready to attach is shown in FIG. 5C. A cross-sectional side view of the first brewing material holder 30a taken along line 4-4 of FIG. 3 showing the brewing material holder 30a with the tamping spring 36 and bottom tamper 34, a portion of brewing material 41 in the volume 38, and the holder lid 32a attached to the brewing material holder 30a, is shown in FIG. 5D.

A top view of the first holder lid 32a showing the passage 33 provided for the nozzle 19 (see FIG. 2) is shown in FIG. 6.

A side view of a filter paper cup 40 according to the present invention is shown in FIG. 7A and a top view of the filter paper cup 40 is shown in FIG. 7B. The filter paper cup 40 includes a bottom 40b, sides 40a, and a rim 40c. The filter paper cup 40 may be used with the brewing material holder 30a with the rim 40c resting on a top edge of the reusable holder base 31 and held between the holder lid and base when the lid is placed on the base, thereby preventing or restricting the escape of brewing material 41 from the cup 40 when hot water flows into the brewing material holder 30a.

A second embodiment of the filter paper cup 40' with a folding paper lid 40d is shown in FIG. 7C. The lid 40d of the filter paper cup 40' may be folded over the cup 40' after brewing material is poured into the cup. The lid 40d preferably includes a perforation 40e centered on the lid 40d allowing the nozzle 19 to enter and/or inject the hot flow of water into the brewing material 41.

The filter cups may be made from several materials including filter paper, nylon mesh, steel mesh, or any material suitable for filtration.

The first brewing material holder 30a is shown ready for insertion into a first coffee maker 10a in FIG. 8A, the first brewing material holder 30a is shown inserted into the coffee maker 10 before tamping the brewing material 41 in FIG. 8B, and the first brewing material holder 30a is shown in the coffee maker 10 after tamping the brewing material 41 in FIG. 8C. The coffee maker includes a cavity 11 for accepting the brewing material holder and has walls 11a for aligning the brewing material holder in the coffee maker. When the lid 14 is closed, the pad 17 on the bottom of the lid 14 and/or arms 25 attached to the bottom of the lid 25, push the brewing material holder 30a down over the tamping spring 36 and the brewing material 41 is tamped between the lid 32a and the bottom tamper 34. The arms 25 push the brewing material holder 30a down ahead of the nozzle 19 thereby seating the brewing material holder 30a in the cavity 11 for alignment of the nozzle 19 with the passage 33 in the lid 32a.

A side view of a second brewing material holder 30b according to the present invention is shown in FIG. 9 and a cross-sectional side view of the second brewing material holder 30b taken along line 10-10 of FIG. 9 is shown in FIG. 10. The brewing material holder 30b includes the reusable holder base 31, a second holder lid 32b, a tam ping spring 36, a spring washer 35a, and a top tamper 35b.

A cross-sectional side view of the second brewing material holder 30b taken along line 10-10 of FIG. 9 showing an empty brewing material holder 30b is shown in FIG. 11A. A cross-sectional side view of the second brewing material holder 30b taken along line 10-10 of FIG. 9 showing the holder lid 32b and a loose portion of brewing material 41 above the empty brewing material holder 30b is shown in FIG. 11B. A cross-sectional side view of the second brewing material holder 30b taken along line 10-10 of FIG. 9 showing the holder lid 32b above the brewing material holder 30b with the portion of brewing material 41 in the brewing material holder 32b is shown in FIG. 11C. A cross-sectional side view of the second brewing material holder 32b taken along line 10-10 of FIG. 9 showing the brewing material holder with the holder lid 32b attached to the brewing material holder 30b and a portion of brewing material 41 in the brewing material holder 30b is shown in FIG. 11D. The tamping spring 36 extends upward out of the brewing material holder 30b for tamping the brewing material as disclosed hereafter. The top tamper 35b includes a passage 35' allowing heated water to be introduced by a coffee maker into the brewing material holder 30b under pressure.

A top view of the second holder lid 32b is shown in FIG. 12. The holder lid 32b includes a larger passage 33a allowing passage of the tamping spring 36 through the holder lid 32b.

A top view of the bottom tamper 34 is shown in FIG. 13. The bottom tamper 34 includes perforations 34a to allow coffee drink to pass through the bottom tamper 34.

Figure 14C:
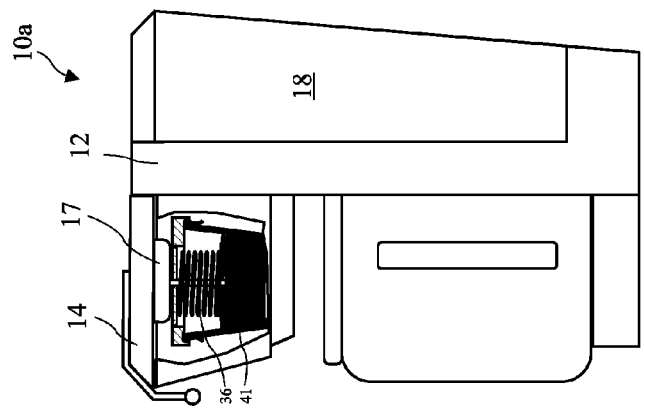
FIG. 14C shows the second brewing material holder inserted into the coffee maker after tamping the coffee.
Figure 14B:
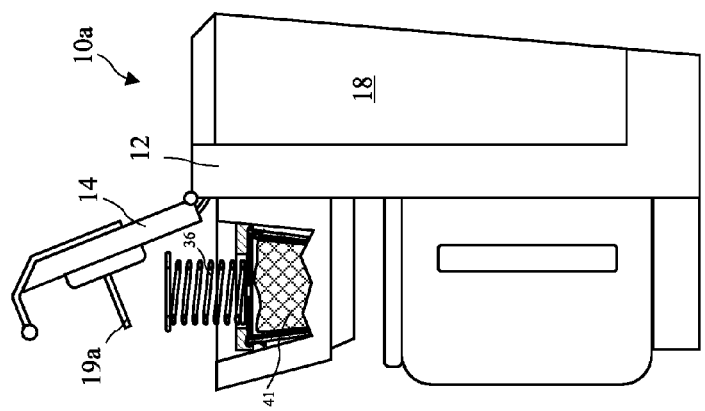
FIG. 14B shows the second brewing material holder inserted into the coffee maker before tamping the coffee.
Figure 14A:
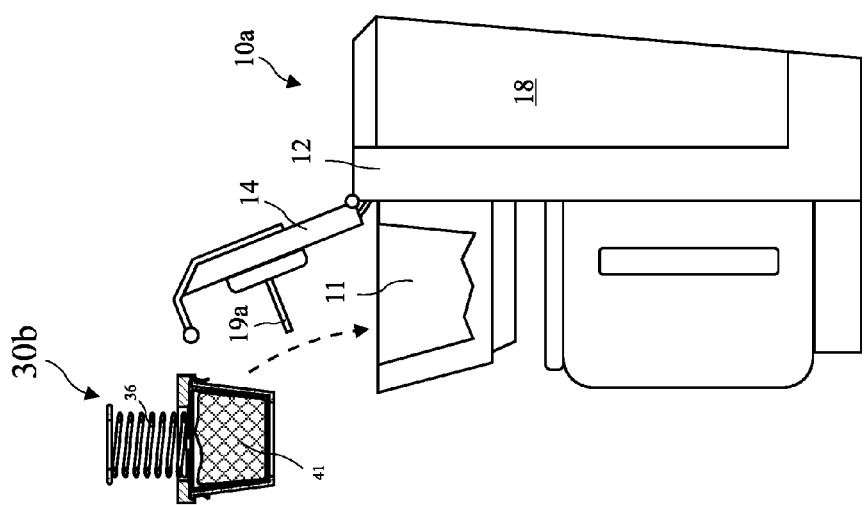
FIG. 14A shows the second brewing material holder ready for insertion into the coffee maker.

The second brewing material holder 30b is shown ready for insertion into the coffee maker 10 in FIG. 14A, the second brewing material holder 30b is shown inserted into the coffee maker 10 before tamping the brewing material 41 in FIG. 14B, and the second brewing material holder 30b is shown in the coffee maker 10 after tamping the brewing material 41 in FIG. 14C. The coffee maker 10 may include a long nozzle 19a to reach the top tamper 35b for "injection" of the heated water into the tamped brewing material, but the heated water may pass through the brewing material 41 under the pull of gravity.

Figures 15, 16:
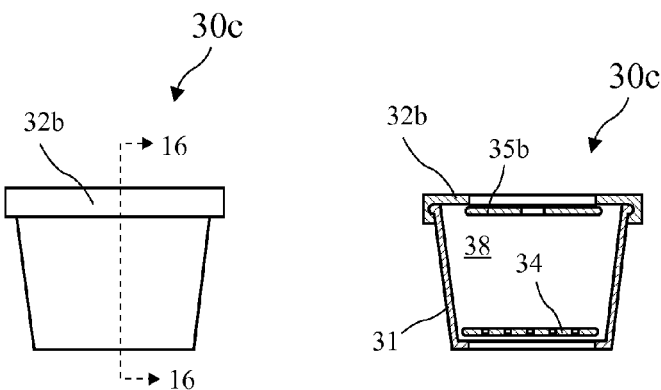
FIG. 15 is a side view of a third brewing material holder according to the present invention.
FIG. 16 is a cross-sectional side view of the third brewing material holder according to the present invention taken along line 16-16 of FIG. 15.

A side view of a third brewing material holder 30c according to the present invention is shown in FIG. 16 and a cross-sectional side view of the third brewing material holder 30c taken along line 16-16 of FIG. 15 is shown in FIG. 16. The brewing material holder 30c includes the reusable holder base 31, the second holder lid 32b, the bottom tamper 34, and the top tamper 35b.

Figures 17A, 17B, 17C:
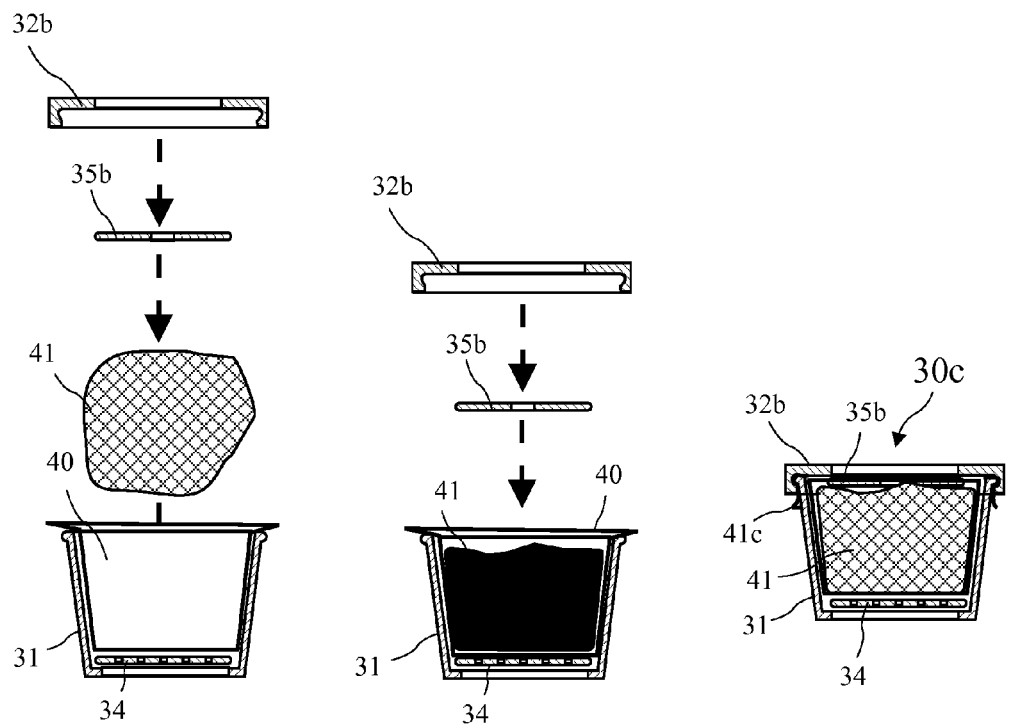
FIG. 17A is a cross-sectional side view of the third brewing material holder according to the present invention taken along line 16-16 of FIG. 15 showing the portion of brewing material above the brewing material holder and the top tamper and the holder lid ready to attach to the brewing material holder, according to the present invention.
FIG. 17B is a cross-sectional side view of the third brewing material holder according to the present invention taken along line 16-16 of FIG. 15 showing the portion of brewing material in the brewing material holder, and the top tamper and the holder lid ready to attach to the brewing material holder, according to the present invention.
FIG. 17C is a cross-sectional side view of the third brewing material holder according to the present invention taken along line 16-16 of FIG. 15 showing the portion of brewing material in the brewing material holder, and the bottom tamper, the top tamper, and the holder lid attached to the brewing material holder, according to the present invention.

A cross-sectional side view of the third brewing material holder 30c taken along line 16-16 of FIG. 15 showing the brewing material holder 30c with the holder lid 32b, the top tamper 35b, and a portion of brewing material, ready to attach to the holder 31, is shown in FIG. 17A. A cross-sectional side view of the third brewing material holder taken along line 16-16 of FIG. 15 showing the brewing material holder 30c with the holder lid 32b and the top tamper ready to attach, and a portion of brewing material 41 in the brewing material holder, is shown in FIG. 17B. A cross-sectional side view of the third brewing material holder 30c taken along line 16-16 of FIG. 15 showing the brewing material holder with the holder lid and the top tamper attached and a loose portion of brewing material 41 in the brewing material holder is shown in FIG. 17C. The brewing material holder 30c is configured to use with a coffee make 10b (see FIGS. 18A-18C) including apparatus for entering the brewing material holder for tamping the brewing material 41.

Figure 18C:
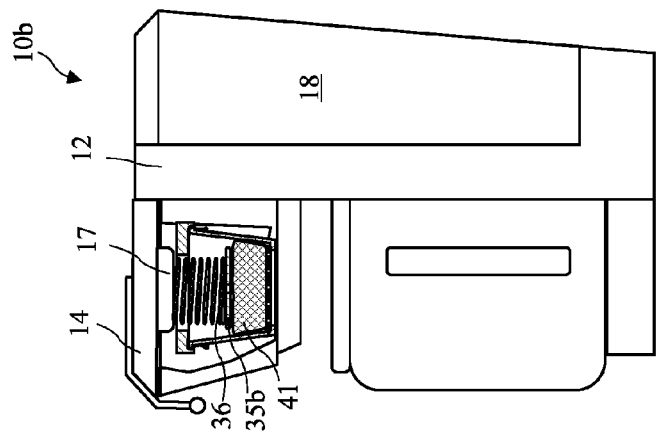
FIG. 18C shows the third brewing material holder inserted into the coffee maker after tamping the coffee.
Figure 18B:
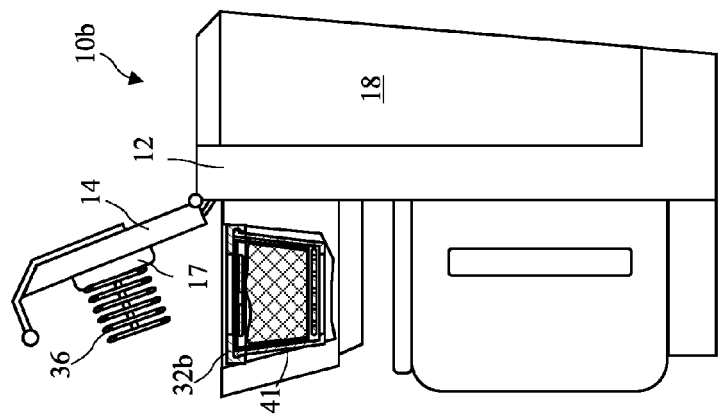
FIG. 18B shows the third brewing material holder inserted into the coffee maker before tamping the coffee.
Figure 18A:
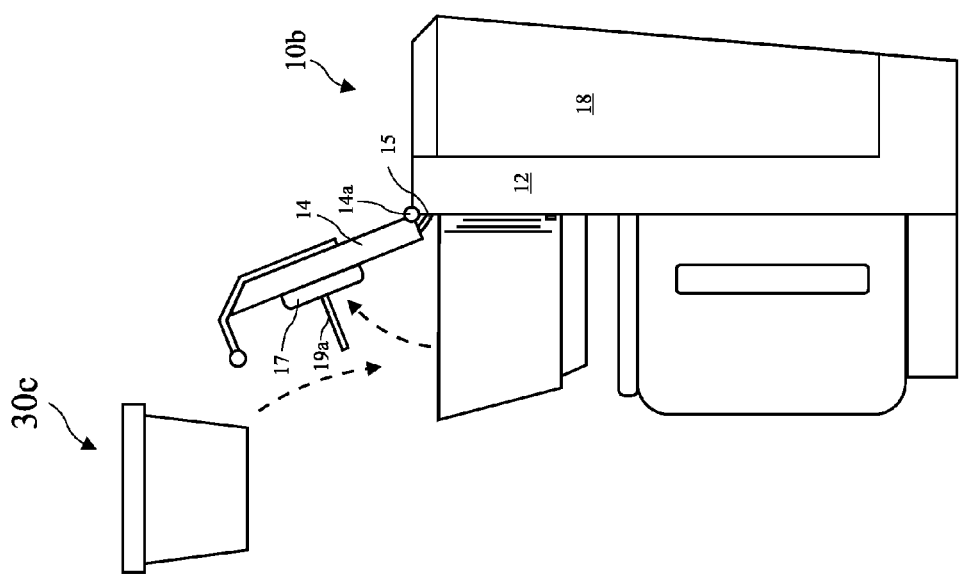
FIG. 18A shows the third brewing material holder ready for insertion into a second coffee maker according to the present invention.

The third brewing material holder 30c ready for insertion into a second coffee maker 10b in FIG. 18A, the third brewing material holder 30c is shown residing in the coffee maker 10b before tamping the brewing material 41 in FIG. 18B, and the third brewing material holder 30c is shown residing in the coffee maker 10b after tamping the brewing material 41 in FIG. 18C. The coffee maker 10b includes the tamping spring 36 attached to the pad 17 on the bottom of the lid 14. When the lid 14 is closed the tamping spring 36 enters the brewing material holder 30c through the lid passage 33a (see FIG. 12) and pushes the top tamper 35b against the brewing material 41 to tamp the brewing material 41.

Figure 19:
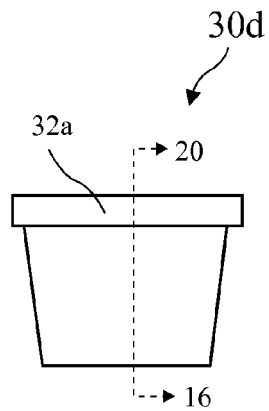
FIG. 19 is a side view of a fourth brewing material holder according to the present invention.
Figure 20:
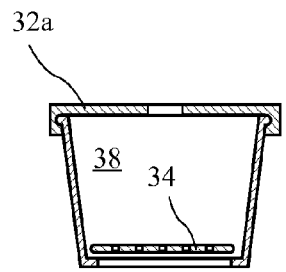
FIG. 20 is a cross-sectional side view of the fourth brewing material holder according to the present invention taken along line 20-20 of FIG. 19.

A side view of a fourth brewing material holder 30d according to the present invention is shown in FIG. 19 and a cross-sectional side view of the fourth brewing material holder 30d taken along line 20-20 of FIG. 19 is shown in FIG. 20. The brewing material holder 30d includes the reusable holder base 31, the first holder lid 32a, and the bottom tamper 34.

Figure 21A:
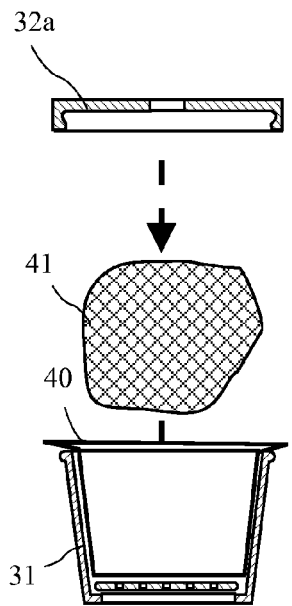
FIG. 21A is a cross-sectional side view of the fourth brewing material holder according to the present invention taken along line 20-20 of FIG. 19 showing the brewing material holder with the bottom tamper, a portion of brewing material, and the holder lid ready to attach, according to the present invention.
Figure 21B:
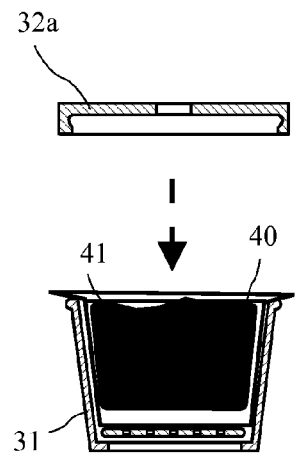
FIG. 21B is a cross-sectional side view of the fourth brewing material holder according to the present invention taken along line 20-20 of FIG. 19 showing the brewing material holder with the bottom tamper, a portion of brewing material in the brewing material holder, and the holder lid ready to attach, according to the present invention.
Figure 21C:
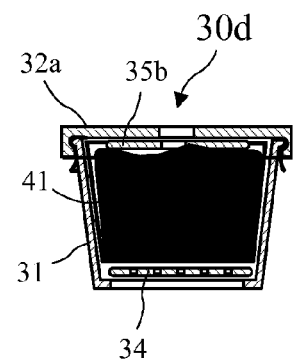
FIG. 21C is a cross-sectional side view of the fourth brewing material holder according to the present invention taken along line 20-20 of FIG. 19 showing the brewing material holder with the bottom tamper, a portion of brewing material in the brewing material holder, and the holder lid attached, according to the present invention.

A cross-sectional side view of the fourth brewing material holder 30d taken along line 20-20 of FIG. 19 showing the brewing material holder with the bottom tamper 34, and a portion of brewing material 41 and the holder lid ready to attach is shown in FIG. 21A. A cross-sectional side view of the fourth brewing material holder 30d taken along line 20-20 of FIG. 19 showing the brewing material holder 30d with the bottom tamper 34, the portion of brewing material 41 in the brewing material holder 30d, and the holder lid 32a ready to attach is shown in FIG. 21B. A cross-sectional side view of the fourth brewing material holder 30d taken along line 20-20 of FIG. 19 showing the brewing material holder 30d with the bottom tamper 34, a portion of brewing material in the brewing material holder 41, and the holder lid 32a is shown in FIG. 21C.

The fourth brewing material holder 30d ready for insertion into another embodiment of the second coffee maker 10b in FIG. 22A, the fourth brewing material holder 30d is shown residing in the coffee maker 10b before tamping the brewing material 41 in FIG. 22B, and the fourth brewing material holder 30d is shown residing in the coffee maker 10b after tamping the brewing material 41 in FIG. 22C. The coffee maker 10b may include the tamping spring 36 residing in the bottom of the brewing material holder cavity 11. When the lid 14 is closed, the pad 17 pushed the brewing material holder 30d down over the tamping spring 36 and the tamping spring 36 enters the brewing material holder 30c through the bottom of the reusable holder base 31 and pushes the bottom tamper 34 against the brewing material 41 to tamp the brewing material 41.

Figure 23C:
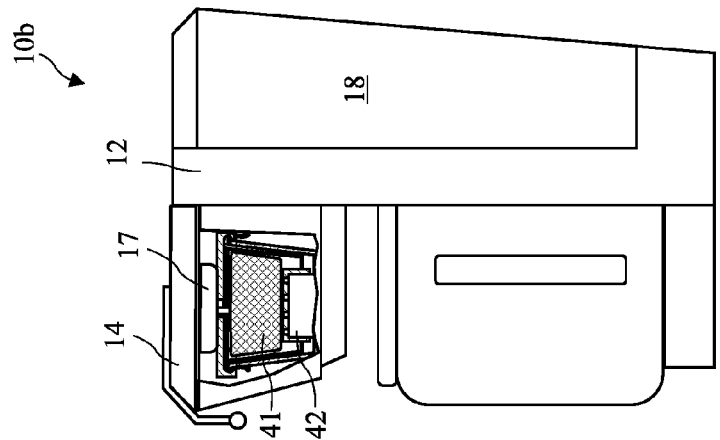
FIG. 23C shows the fourth brewing material holder inserted into the coffee maker having the tamping block after tamping the coffee.
Figure 23B:
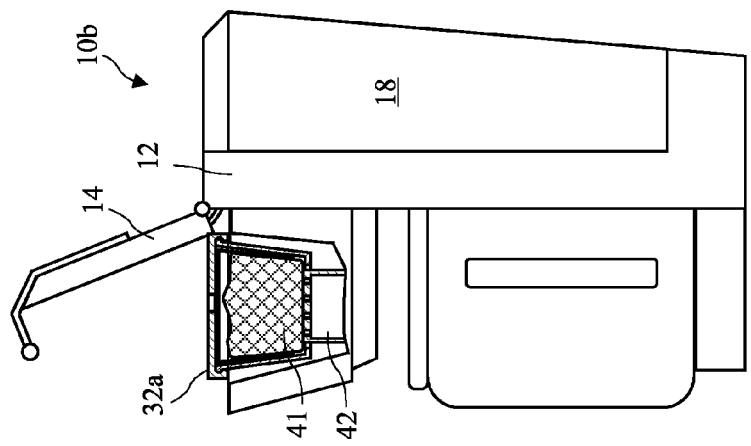
FIG. 23B shows the fourth brewing material holder inserted into the coffee maker having the tamping block before tamping the coffee.
Figure 23A:
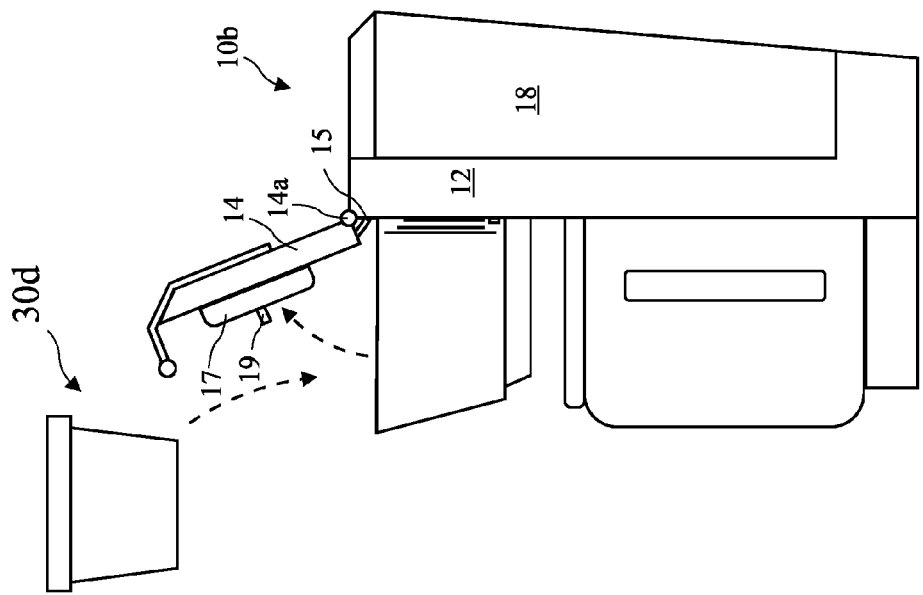
FIG. 23A shows the fourth brewing material holder ready for insertion into the coffee maker having a tamping block according to the present invention.

The fourth brewing material holder 30d ready for insertion into another embodiment of the second coffee maker 10b in FIG. 23A, the fourth brewing material holder 30d is shown residing in the coffee maker 10b before tamping the brewing material 41 in FIG. 23B, and the fourth brewing material holder 30d is shown residing in the coffee maker 10b after tamping the brewing material 41 in FIG. 23C. The coffee maker 10b may include a resilient block 42 residing in the bottom of the brewing material holder cavity 11. When the lid 14 is closed, the pad 17 pushed the brewing material holder 30d down over the resilient block 42 and the resilient block 42 enters the brewing material holder 30c through the bottom of the reusable holder base 31 and pushes the bottom tamper 34 against the brewing material 41 to tamp the brewing material 41.

A side view of a fifth brewing material holder 30e according to the present invention is shown in FIG. 24 and a cross-sectional side view of the fifth brewing material holder 30e taken along line 25-25 of FIG. 24 is shown in FIG. 25. The fifth brewing material holder 30e includes the reusable holder base 31, the holder lid 32b, the tamping spring 36 and the top tamper 35b attached to the holder lid 32a. The top tamper 35b includes a passage 35' allowing heated water to be introduced by a coffee maker into the brewing material holder 30b under pressure.

A cross-sectional side view of the fifth brewing material holder 30e taken along line 25-25 of FIG. 24 showing the brewing material holder 30e with a portion of brewing material 41, and the holder lid 32b with the top tamper 35b and tamping spring 36 attached, above the reusable holder base 31, is shown in FIG. 26A. A cross-sectional side view of the fifth brewing material holder 30e taken along line 25-25 of FIG. 24 showing the brewing material holder with the portion of brewing material 41 in the brewing material holder, and the holder lid 32b with the top tamper 35b and tamping spring 36 attached, above the reusable holder base 31, is shown in FIG. 26B. A cross-sectional side view of the fifth brewing material holder 30e taken along line 25-25 of FIG. 24 showing the brewing material holder 30e with the portion of brewing material 41 in the brewing material holder 30e, and the holder lid 32b with the top tamper 35b and tamping spring 36 attached to the reusable holder base 31 is shown in FIG. 26D. The tamping spring 36 and top tamper 35b tamp the brewing material 41 to provide a tamped brewing material when the holder lid 32b is attached to the reusable holder base 31.

A side view of a sixth brewing material holder 30f according to the present invention is shown in FIG. 27 and a cross-sectional side view of the sixth brewing material holder 30f taken along line 28-28 of FIG. 27 is shown in FIG. 28. The sixth brewing material holder 30f includes the reusable holder base 31 and a third holder lid 32c. The third holder lid 32c includes a recessed portion 32' which reaches into the interior of the sixth brewing material holder 30f. The recessed portion 32' is preferably a solid resilient material.

A cross-sectional side view of the sixth brewing material holder 30f taken along line 28-28 of FIG. 27 showing the sixth brewing material holder 30f with a portion of brewing material 41, and the holder lid 32c, above the reusable holder base 31, is shown in FIG. 29A. A cross-sectional side view of the sixth brewing material holder 30f taken along line 28-28 of FIG. 27 showing the brewing material holder 30f with the portion of brewing material 41 in the brewing material holder, and the holder lid 32c above the reusable holder base 31, is shown in FIG. 29B. A cross-sectional side view of the sixth brewing material holder 30f along line 28-28 of FIG. 27 showing the sixth brewing material holder 30f with the portion of brewing material 41 in the brewing material holder 30e, and the holder lid 32e attached to the reusable holder base 31 is shown in FIG. 26D. The recessed portion 32' tamps the brewing material 41 to provide a tamped brewing material when the holder lid 32e is attached to the reusable holder base 31. The recessed portion 32' is preferably made from a resilient material to cushion the tamping of the brewing material.

Figure 30:
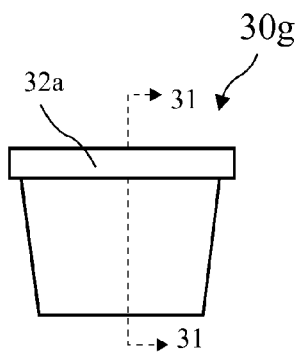
FIG. 30 is a side view of a seventh brewing material holder according to the present invention.
Figure 31:
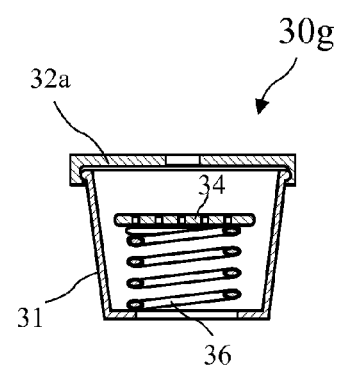
FIG. 31 is a cross-sectional side view of the seventh brewing material holder according to the present invention taken along line 31-31 of FIG. 30.

A side view of a seventh brewing material holder 30g according to the present invention is shown in FIG. 30 and a cross-sectional side view of the seventh brewing material holder 30g taken along line 31-31 of FIG. 30 is shown in FIG. 31. The seventh brewing material holder 30g includes the reusable holder base 31, the holder lid 32b, the tamping spring 36, and the bottom tamper 34 inside the reusable holder base 31.

Figure 32A:
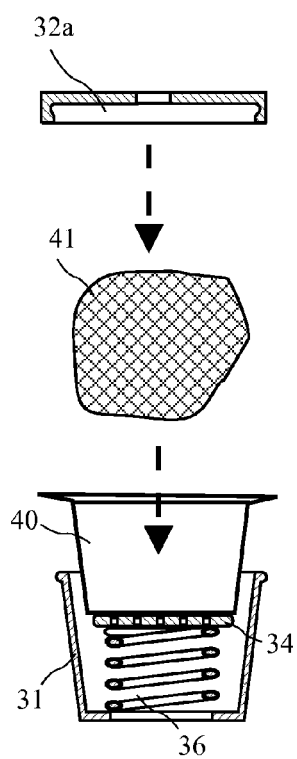
FIG. 32A is a cross-sectional side view of the seventh brewing material holder according to the present invention taken along line 31-31 of FIG. 30 showing the portion of brewing material above the brewing material holder, and the holder lid ready to attach to the reusable holder base, according to the present invention.
Figure 32B:
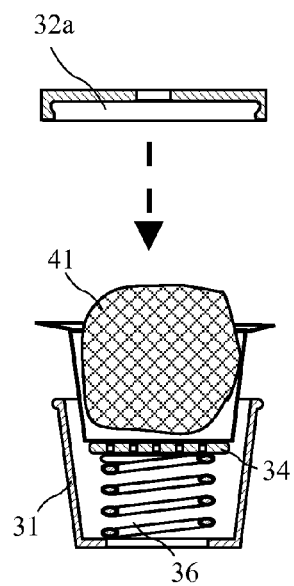
FIG. 32B is a cross-sectional side view of the seventh brewing material holder according to the present invention taken along line 31-31 of FIG. 30 showing the portion of brewing material in the brewing material holder, and the holder lid ready to attach to the reusable holder base. according to the present invention.
Figure 32C:
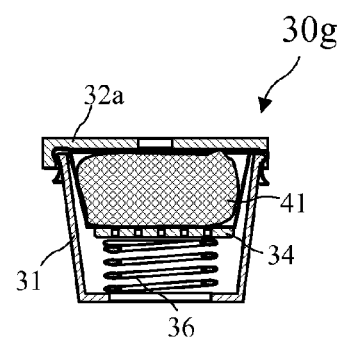
FIG. 32C is a cross-sectional side view of the seventh brewing material holder according to the present invention taken along line 31-31 of FIG. 30 showing the portion of brewing material in the brewing material holder, and the holder lid attached to the reusable holder base and the coffee tamped between the bottom tamper and spring and the holder lid, according to the present invention.

A cross-sectional side view of the seventh brewing material holder 30g taken along line 31-31 of FIG. 30 showing the seventh brewing material holder 30g with a portion of brewing material 41 and the holder lid 32a above the reusable holder base 31, and with the bottom tamper 34 and tamping spring 36 inside the reusable holder base 31, is shown in FIG. 32A. A cross-sectional side view of the seventh brewing material holder 30g taken along line 31-31 of FIG. 30 showing the brewing material holder with the portion of brewing material 41 in the filter paper 40 in the reusable holder base 31 resting on the bottom tamper 34 supported by the tamping spring 36, and the holder lid 32a above the reusable holder base 31, is shown in FIG. 32B. A cross-sectional side view of the seventh brewing material holder 30g taken along line 31-31 of FIG. 30, showing the seventh brewing material holder 30g with the portion of brewing material 41 in the brewing material holder 30e, and the holder lid 32a attached to the reusable holder base 31, is shown in FIG. 32C. The tamping spring 36 and bottom tamper 34 tamp the brewing material 41 upward against the holder lid 32a to provide a tamped brewing material when the holder lid 32a is attached to the reusable holder base 31.

A side view of an eighth brewing material holder 30h according to the present invention is shown in FIG. 33, a cross-sectional side view of the eighth brewing material holder 30h taken along line 34-34 of FIG. 33 showing a portion of brewing material 41 for placing inside the brewing material holder and a fourth holder lid 32d with an insertable portion and an O-Ring 50 inside the brewing material holder for sealing is shown in FIG. 34A, and a cross-sectional side view of the eighth brewing material holder taken along line 34-34 of FIG. 33 showing the portion of brewing material 41 inside the brewing material holder 30h and the holder lid 32d with the insertable portion inserted into the brewing material holder base 31a is shown in FIG. 34B. The filter paper 40 extends up above the O-ring 50 and the O-Ring 50 cooperates with the holder lid 32d to sandwich the top edge of the filter paper 40 for sealing the filter paper 40 to reduce or prevent the brewing material 41 from escaping when the flow of hot water is provided to the brewing material holder 30h. The reusable holder base 31a is preferably cylindrical but may also be conical in shape.

A side view of a ninth brewing material holder 30i according to the present invention is shown in FIG. 35, a cross-sectional side view of the ninth brewing material holder 30i taken along line 36-36 of FIG. 35 showing a portion of brewing material 41 for placing inside the brewing material holder and a fifth holder lid 32e with a threaded portion for screwing inside the reusable holder base 31b for sealing is shown in FIG. 36A, and a cross-sectional side view of the ninth brewing material holder 30i taken along line 36-36 of FIG. 35 showing the portion of brewing material 41 inside the brewing material holder and the holder lid 32e with the threaded portion screwed into the brewing material holder and tamping the brewing material 41 is shown in FIG. 36B. The threads both provide tamping and sealing the coffee to reduce or prevent the brewing material 41 from escaping when the flow of hot water is provided to the brewing material holder 30h. The reusable holder base 31b is preferably cylindrical to facilitate having internal threads, and at least the threaded portion is preferably cylindrical.

A third coffee maker 10c having a brewing material holder 30 according to the present invention for receiving a portion of brewing material, and a tamping spring 36 for tamping the coffee, is shown in FIG. 37A, the third coffee maker 10c with the brewing material holder 30 holding the portion of brewing material 41 is shown in FIG. 37B, and the third coffee maker 10c with the brewing material holder 30 holding the portion of brewing material 41 with the coffee maker lid 14 closed for tamping the brewing material 41 is shown in FIG. 37C. When the coffee maker lid 14 is closed, the pad 17 pushes the brewing material holder 30 down and the tamping spring 36 enters the bottom of the brewing material holder 30 to tamp the brewing material 41. While attaching the lid 32a to the holder 30 is preferred in order to prevent coffee grounds from escaping the holder 30, the coffee maker 10c may also be used without the lid 32a and the pad 17 may serve to seal the brewing material 41 in the holder 30. In this instance, the coffee maker lid 14 serves as a brewing material holder lid.

A third coffee maker 10c having a brewing material holder for receiving a portion of brewing material, and tamping spring 36 attached to the coffee maker lid 14, according to the present invention for tamping the brewing material 41 when the coffee maker lid 14 is closed is shown in FIG. 38A, the third coffee maker 10c with the brewing material holder 30 holding the portion of brewing material 41 is shown in FIG. 38B, and the third coffee maker 10c with the brewing material holder 30 holding the portion of brewing material 41 with the coffee maker lid 14 closed to push the tamping spring 36 into the brewing material holder 30 for tamping the brewing material 41 is shown in FIG. 38C.

A fourth coffee maker 10d having a third holder base 31c for receiving a packet 41a containing untamped brewing material, a knife 50 for cutting the packet 41a open, and tamping spring 36 under the reusable holder base 31c, according to the present invention, for tamping the brewing material when the coffee maker lid is closed, is shown in FIG. 39A, the fourth coffee maker 10d with the reusable holder base 31c holding the packet 41a of untamped brewing material is shown in FIG. 39B, and fourth coffee maker with the reusable holder base 31c holding the packet of tamped brewing material 41c with the coffee maker lid 14 closed to push the reusable holder base down over the tamping spring 36 for tamping the brewing material is shown in FIG. 39C. The coffee maker 10d includes a somewhat pointed nozzle 19a to puncture the packet 41a to provide the flow of hot water to the tamped brewing material in the packet 41a. Known brewing material packets include internal filters to allow a flow of hot water through the packet to make the brewed drink while preventing brewing material grounds from escaping. The cut in the packet 41a made by the knife 50 allows the brewed drink to escape from the packet while filter material in the packet 41a prevent brewing material grounds from escaping. The tamping spring 36 may also be attached to the lid 14 as in FIGS. 38A-38C.

The packet 41a may be an air tight pod containing brewing material in filter paper and positioning the knife on the side of the reusable holder base 31c results in less likelihood of the knife 50 cutting the filter paper. The packet 41a is preferably air tight to maintain coffee freshness and may be plastic, metal foil, or other air tight material which is sufficiently flexible to allow the coffee contained in the packet 41a to be tamped. Alternatively, the knife 50 may be eliminated when the packet 41a is configured to burst under pressure to expose the brewing material, for example, when the coffee maker tamps the brewing material, the packet 41a also bursts. In one embodiment, filter paper 41 is inserted into the reusable holder base 31c without the knife 50, and the packet 41a bursts during compacting to release the brewed drink into the filter paper.

Known coffee makers use a sealed cup or capsule having a somewhat ridged cup with a foil cover. Such cups might be compressible and used in the coffee maker 10d, however, a similar cup or capsule having a less ridged cup which may be compressed in the coffee maker 10d are more suitable for use in the coffee maker 10d to allow tamping of the brewing material contained in the cup or capsule.

Figure 40C:
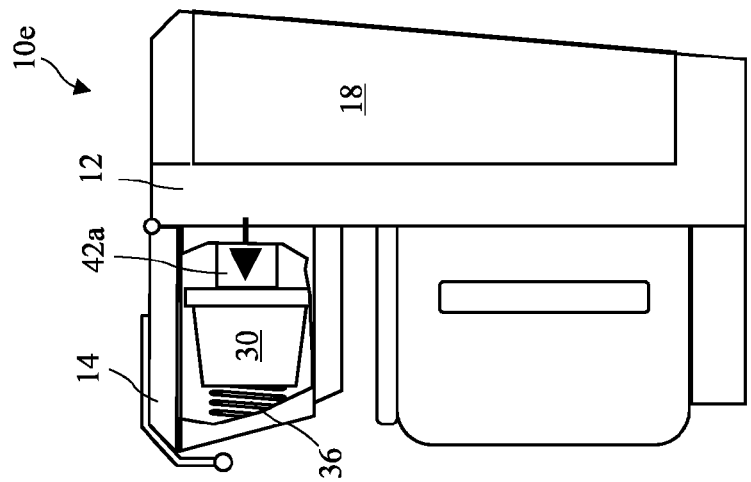
FIG. 40C shows the fifth coffee maker with the brewing material holder residing horizontally in the brewing material holder cavity with the coffee maker lid closed and the brewing material holder pushed against the tamping spring for tamping the coffee, according to the present invention.
Figure 40B:
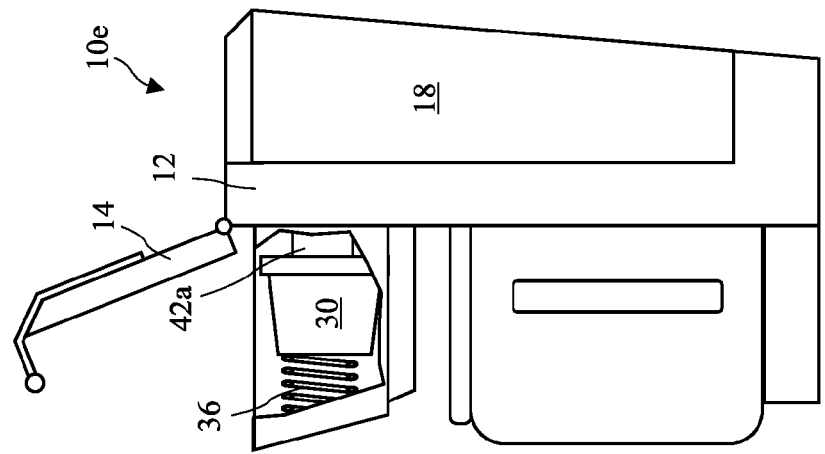
FIG. 40B shows the fifth coffee maker with the brewing material holder residing horizontally in the brewing material holder cavity according to the present invention for tamping the coffee when the coffee maker lid is closed.
Figure 40A:
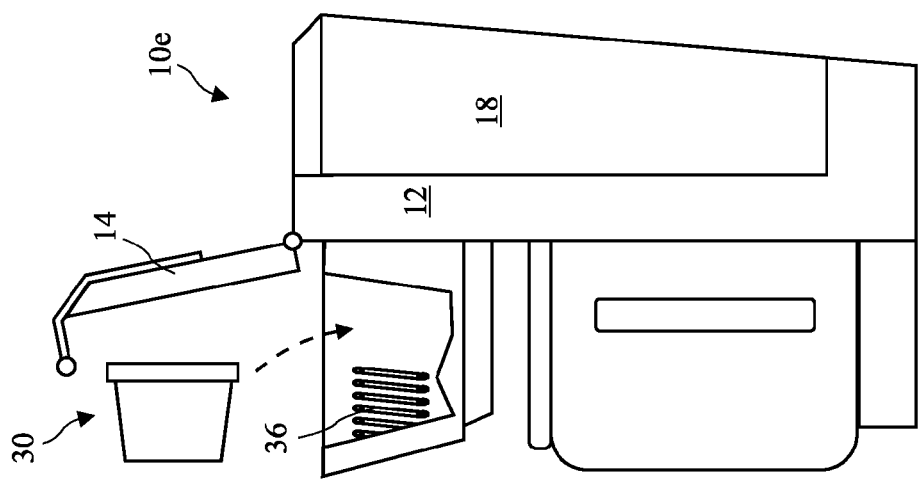
FIG. 40A shows a fifth coffee maker accepting a horizontal brewing material holder and tamping spring residing horizontally in a brewing material holder cavity according to the present invention for tamping the coffee when the coffee maker lid is closed.

A fifth coffee maker 10e for horizontally receiving the brewing material holder 30 is shown in FIG. 40A, the fifth coffee maker with the brewing material holder 30 residing in the coffee maker is shown in FIG. 40B, and the fifth coffee maker with the coffee maker lid 14 closed and the tamping spring 36 entering the brewing material holder 30 for tamping the brewing material 41 is shown in FIG. 40C. The fifth coffee maker 10d may alternatively include a tamping spring entering the brewing material holder top, or a resilient solid block pushed into the brewing material holder 30 to tamp the brewing material. Preferably, a horizontal ram 42a is actuated when the lid 14 is closed and pushed the brewing material holder 30 against the spring 36 to tamp the brewing material. The horizontal ram 42a may actuated by an electrical solenoid, by pressure, or by mechanical levers connected to the lid 14. The fifth coffee maker 10e may further include any of the features described above for other embodiments of the coffee maker according to the present invention and may be configured to use any of the brewing material holders described above according to the present invention.

A side view of a tenth brewing material holder 30j with straight walls according to the present invention is shown in FIG. 41, and a cross-sectional view of the tenth brewing material holder 30j taken along line 42-42 of FIG. 41 showing an empty brewing material holder is shown in FIG. 42. The brewing material holder 30j provides straight cylindrical inside walls allowing a better fit between the top tamper 35b and the inside walls to reduce or eliminate brewing material 41 escaping past the top tamper 35b during tamping.

A cross-sectional view of the tenth brewing material holder 30j taken along line 42-42 of FIG. 41 showing a full and tamped brewing material holder is shown in FIG. 43. The tamping spring 36 has been pushed down by the lid 32b to tamp the brewing material 41.

A side view of an eleventh brewing material holder 30k with straight walls according to the present invention is shown in FIG. 44, a cross-sectional view of the eleventh brewing material holder 30k taken along line 45-45 of FIG. 44 showing an empty brewing material holder is shown in FIG. 45, and a cross-sectional view of the eleventh brewing material holder 30k taken along line 45-45 of FIG. 41 showing a full and tamped brewing material holder 30f is shown in FIG. 46. As with the brewing material holder 30j, the brewing material holder 30k provides straight cylindrical inside walls allowing a better fit between the lid 32f and the inside walls to reduce or eliminate brewing material 41 escaping past the lid 32f during tamping. The lid 32f may be used with or without the top tamper 35b.

A side view of a top tamper 35b is shown in FIG. 47A and a top view of the top tamper 35b is shown in FIG. 47B. A side view of a top tamper 35b' with a seal 60 according to the present invention is shown in FIG. 47C and a top view of the top tamper 35b' with the seal 60 is shown in FIG. 47D. In some instances, for example with a very fine ground coffee, an amount of coffee may escape past the top tamper 35b. In such instances, a user may prefer to use the top tamper 35b' with the seal 60 to reduce or eliminate the escape of the coffee.

A perspective view of a filter paper cup 40' with a folding cup lid 40d is shown in FIG. 48 (also see FIG. 7C). The cup lid 40d may be folded over the rim 40c to reduce or prevent coffee from escaping during tamping of subsequent processing. The lid 40d may also include a perforation 40e centered on the lid 40d allowing the nozzle 19 to enter and/or inject the hot flow of water into the tamped brewing material 41, but in some embodiments, the lid 40d does not include the perforation 40e. The filter paper cup 40' may be used in the coffee containers described herein, and may able be used in a coffee machine having a cavity for receiving the filter paper cup 40'. While the cup 40' is preferably made from filter paper, the cup may also be made from a reusable mesh.

A side view of an twelfth brewing material holder 30l with straight walls according to the present invention is shown in FIG. 49, and a cross-sectional view of the twelfth brewing material holder 30I taken along line 50-50 of FIG. 49 showing an empty brewing material holder is shown in FIG. 50. The twelfth brewing material holder 30l includes a straight walled base 31a and the tamping spring below the brewing material, and additionally uses the filter paper cup 40' with the folding lid 40d.

A cross-sectional view of the twelfth brewing material holder 30l taken along line 50-50 of FIG. 49 showing the lid 32a, brewing material 41, the filter paper cup 40' with lid 40d, above the brewing material holder base 31a is shown in FIG. 51A, a cross-sectional view of the twelfth brewing material holder 30l taken along line 50-50 of FIG. 49 showing the lid 32a, above the brewing material 41, and the filter paper cup 40' resting in the brewing material holder base 31a is shown in FIG. 51B, a cross-sectional view of the twelfth brewing material holder 30l taken along line 50-50 of FIG. 49 showing the lid 32a, above the brewing material 41 and the filter paper cup 40' resting in the brewing material holder base 31a with the filter paper cover 40d folded over the brewing material 41 in the filter paper cup 40' is shown in FIG. 51C, and a cross-sectional view of the twelfth brewing material holder 30l taken along line 50-50 of FIG. 49 showing the lid 32a attached to the base 31a with the brewing material 41 and the filter paper cup 40' residing in the brewing material holder base 31a with the brewing material 41 tamped is shown in FIG. 51D. In embodiments with the brewing material 41 partially exposed above the base 31a, some brewing material 41 may escape during tamping. Using the filter paper cup 40' having the fold over paper lid 40d reduces or eliminates such escape of brewing material 41.

Figure 52:
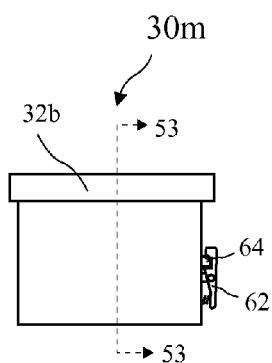
FIG. 52 is a side view of a thirteenth brewing material holder with a releaseable tamping latch according to the present invention.
Figure 53:
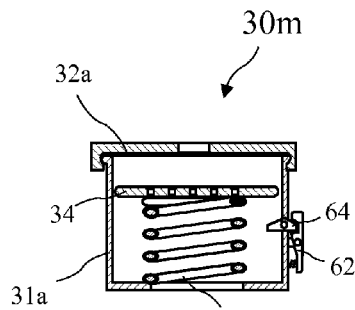
FIG. 53 is a cross-sectional view of the thirteenth brewing material holder taken along line 53-53 of FIG. 52 showing an empty brewing material holder.

A side view of a thirteenth brewing material holder 30m with a releaseable tamping latch 64 according to the present invention is shown in FIG. 52 and a cross-sectional view of the thirteenth brewing material holder 30m taken along line 53-53 of FIG. 52 showing an empty brewing material holder 30m is shown in FIG. 53. The latch 64 is held in a latched position by a spring loaded lever 62 on the exterior of the base 31a.

Figure 54A:
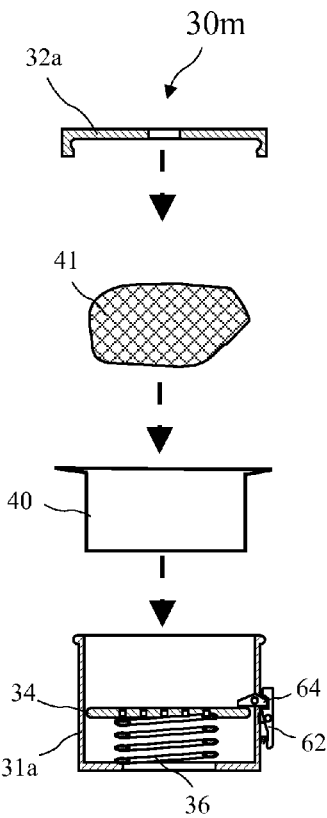
FIG. 54A is a cross-sectional view of the thirteenth brewing material holder taken along line 53-53 of FIG. 52 showing a lid, coffee, a filter paper cup, above the base, and the brewing material holder base, with the tamping latch retaining the bottom tamper.
Figure 54B:
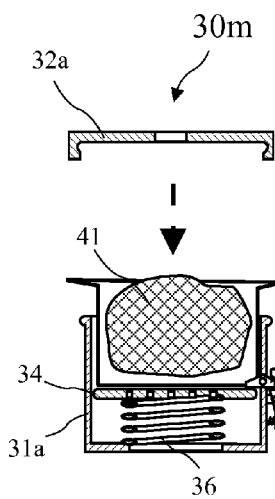
FIG. 54B is a cross-sectional view of the thirteenth brewing material holder taken along line 53-53 of FIG. 52 showing the lid, above the coffee and the filter paper cup resting in the brewing material holder base, with the tamping latch retaining the bottom tamper.
Figure 54C:
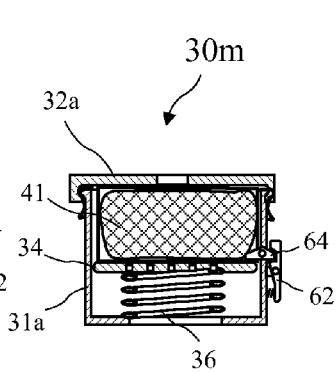
FIG. 54C is a cross-sectional view of the thirteenth brewing material holder taken along line 53-53 of FIG. 52 showing the lid, above the coffee and the filter paper cup resting in the brewing material holder base with the tamping latch retaining the bottom tamper.
Figure 54D:
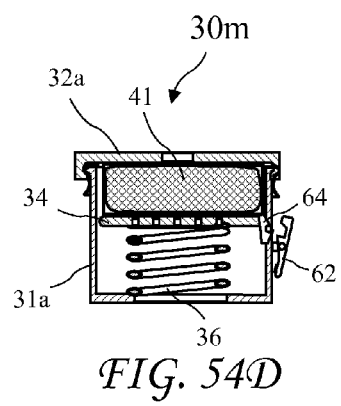
FIG. 54D is a cross-sectional view of the fourteenth brewing material holder taken along line 53-53 of FIG. 52 showing the lid attached to the base with the coffee and the filter paper cup residing in the brewing material holder base with tamping latch released and the coffee tamped.

A cross-sectional view of the thirteenth brewing material holder 30m taken along line 53-53 of FIG. 52 showing the lid 32a, brewing material 41, the filter paper cup 40, above the base 31a, with the tamping latch 64 retaining the bottom tamper 34, is shown in FIG. 54A, a cross-sectional view of the thirteenth brewing material holder 30m taken along line 53-53 of FIG. 52 showing the lid 32a above the brewing material 41 and the filter paper cup 40 resting in the brewing material holder base 31a, with the tamping latch 64 retaining the bottom tamper 34 is shown in FIG. 54B, a cross-sectional view of the thirteenth brewing material holder 30m taken along line 53-53 of FIG. 52 showing the lid 32a attached to the base 31a above the brewing material 41, and the filter paper cup 40 resting in the brewing material holder base 31a with the tamping latch 64 retaining the bottom tamper 34 is shown in FIG. 54C, and a cross-sectional view of the fourteenth brewing material holder 30m taken along line 53-53 of FIG. 52 showing the lid 32a attached to the base 31a with the brewing material 41 and the filter paper cup 40 residing in the brewing material holder base 31a with tamping latch 64 released and the brewing material 41 tamped, is shown in FIG. 54D. The lever 62 thus holds the latch 64 until the lever 62 is pushed to release the latch 62 to release the bottom tamper 34 to tamp the brewing material 41.

Figure 55:
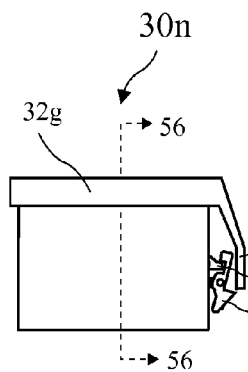
FIG. 55 is a side view of a fourteenth brewing material holder with a releaseable tamping latch according to the present invention.
Figure 56:
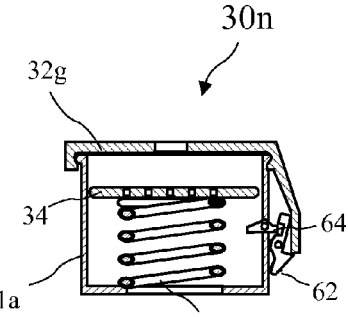
FIG. 56 is a cross-sectional view of the fourteenth brewing material holder taken along line 56-56 of FIG. 55 showing an empty brewing material holder.

A side view of a fourteenth brewing material holder 30n with a releaseable tamping latch 64 according to the present invention is shown in FIG. 55 and a cross-sectional view of the fourteenth brewing material holder taken along line 56-56 of FIG. 55 showing an empty brewing material holder 30n is shown in FIG. 56. The lever 62 holds the latch 64 until the arm 66 attached to the lid 32g pushes the lever 62 to release the latch 64.

Figure 57A:
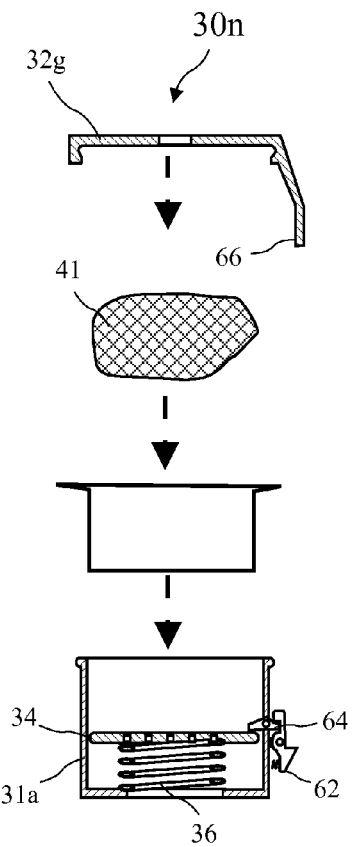
FIG. 57A is a cross-sectional view of the fourteenth brewing material holder taken along line 56-56 of FIG. 55 showing a lid, coffee, a filter paper cup, above the base, and the brewing material holder base, with the tamping latch retaining the bottom tamper.
Figure 57B:
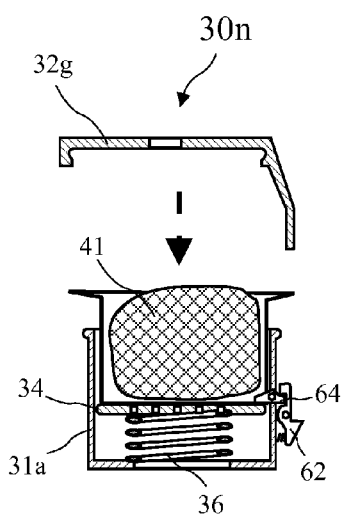
FIG. 57B is a cross-sectional view of the fourteenth brewing material holder taken along line 56-56 of FIG. 55 showing the lid, above the coffee and the filter paper cup resting in the brewing material holder base, with the tamping latch retaining the bottom tamper.
Figure 57C:
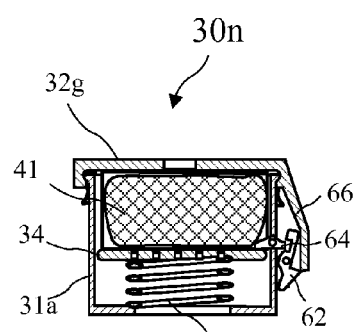
FIG. 57C is a cross-sectional view of the fourteenth brewing material holder taken along line 56-56 of FIG. 55 showing the lid, above the coffee and the filter paper cup resting in the brewing material holder base, with the tamping latch released but just prior to tamping.
Figure 57D:
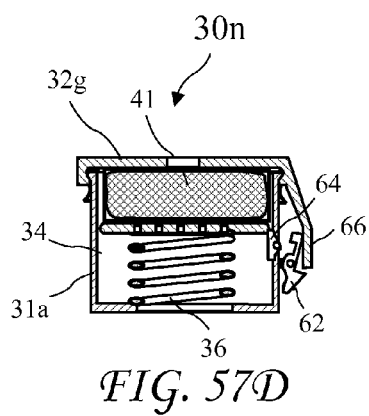
FIG. 57D is a cross-sectional view of the fourteenth brewing material holder taken along line 56-56 of FIG. 55 showing the lid attached to the base with the coffee and the filter paper cup residing in the brewing material holder base with tamping latch released and the coffee tamped.

A cross-sectional view of the fourteenth brewing material holder 30n taken along line 56-56 of FIG. 55 showing the lid 32g, brewing material 41, and the filter paper cup 40, above the brewing material holder base 31a, with the tamping latch 64 retaining the bottom tamper 34 is shown in FIG. 57A, a cross-sectional view of the fourteenth brewing material holder 30n taken along line 56-56 of FIG. 55 showing the lid 32g above the brewing material 41 and the filter paper cup 40 resting in the brewing material holder base 31a, with the tamping latch 64 retaining the bottom tamper 34 is shown in FIG. 57B, a cross-sectional view of the fourteenth brewing material holder 30n taken along line 56-56 of FIG. 55 showing the lid 32g, above the brewing material 41 and the filter paper cup 40 resting in the brewing material holder base 31a with the tamping latch 64 released but just prior to tamping (the bottom tamper has been released but has not moved upward against the brewing material 41) is shown in FIG. 57C, and a cross-sectional view of the fourteenth brewing material holder 30n taken along line 56-56 of FIG. 55 showing the lid 32g attached to the base with the brewing material 41 and the filter paper cup 40 residing in the brewing material holder base 31a with tamping latch 64 released and the brewing material 41 tamped is shown in FIG. 57D. The lever 62 thus holds the latch 64 until the lever 62 is pushed by the arm 66 to release the latch 62 to release the bottom tamper 34 to tamp the brewing material 41.

Figure 58:
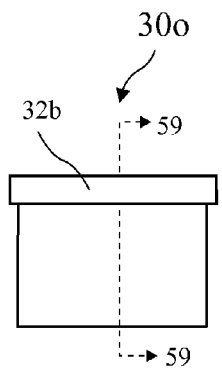
FIG. 58 is a side view of a fourteenth brewing material holder with a releaseable tamping lock according to the present invention.
Figure 59:
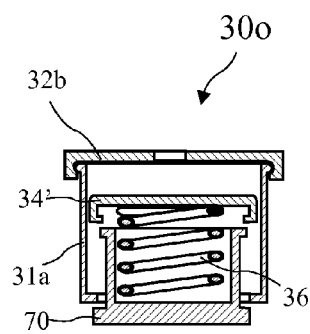
FIG. 59 is a cross-sectional view of the fourteenth brewing material holder taken along line 59-59 of FIG. 58 showing an empty brewing material holder.

A side view of a fourteenth brewing material holder 30o with a releaseable tamping lock according to the present invention is shown in FIG. 58 and a cross-sectional view of the fourteenth brewing material holder 30o taken along line 59-59 of FIG. 58 showing an empty brewing material holder is shown in FIG. 59. The brewing material holder 30o includes a tamping lock 70 which engages a second bottom tamper 34' to hold the second bottom tamper in a down position for filling the brewing material holder with coffee and releases the bottom tamper 34' to be pushed upwards by the tamping spring 36 to tamp the coffee after the holder lid 32b is attached to the base 31a.

Figure 60A:
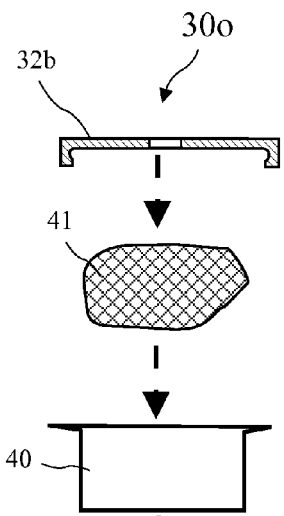
FIG. 60A is a cross-sectional view of the fourteenth brewing material holder taken along line 59-59 of FIG. 58 showing a lid, coffee, a filter paper cup, above the base, and the brewing material holder base, with the tamping lock retaining the bottom tamper.
Figure 60B:
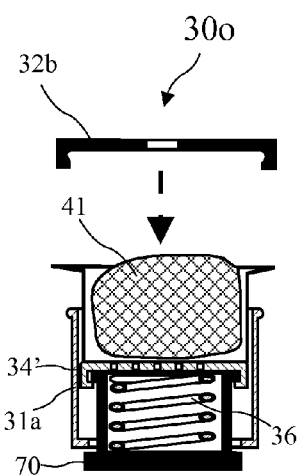
FIG. 60B is a cross-sectional view of the fourteenth brewing material holder taken along line 59-59 of FIG. 58 showing the lid, above the coffee and the filter paper cup resting in the brewing material holder base, with the tamping lock retaining the bottom tamper.
Figure 60C:
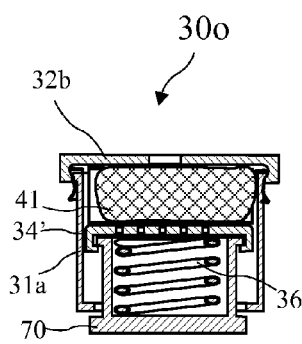
FIG. 60C is a cross-sectional view of the fourteenth brewing material holder taken along line 59-59 of FIG. 58 showing the lid, above the coffee and the filter paper cup resting in the brewing material holder base prior to tamping.
Figure 60D:
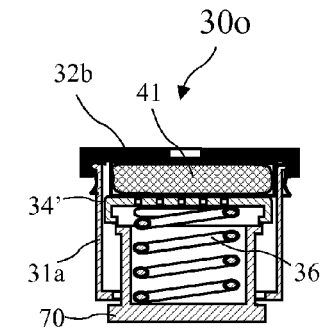
FIG. 60D is a cross-sectional view of the fourteenth brewing material holder taken along line 59-59 of FIG. 58 showing the lid attached to the base with the coffee and the filter paper cup residing in the brewing material holder base with tamping lock released and the coffee tamped.

A cross-sectional view of the fourteenth brewing material holder 30o taken along line 59-59 of FIG. 58 showing a lid 32b, brewing material 41, a filter paper cup 40, above the brewing material holder base 31, with the tamping lock 70 retaining the bottom tamper 34' is shown in FIG. FIG. 60A, cross-sectional view of the fourteenth brewing material holder taken along line 59-59 of FIG. 58 showing the lid, above the coffee and the filter paper cup resting in the brewing material holder base, with the tamping latch retaining the bottom tamper 34' is shown in FIG. FIG. 60B, a cross-sectional view of the fourteenth brewing material holder taken along line 59-59 of FIG. 58 showing the lid, above the coffee and the filter paper cup resting in the brewing material holder base prior to tamping is shown in FIG. 60A, and a cross-sectional view of the fourteenth brewing material holder taken along line 59-59 of FIG. 58 showing the lid 32b attached to the base 31a with the brewing material 41 and the filter paper cup 41 residing in the brewing material holder base 31a with tamping lock released and the coffee tamped is shown in FIG. 60D.

Figure 61:
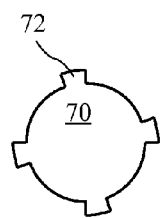
FIG. 61 is a top view of a lock according to the present invention.
Figure 62:
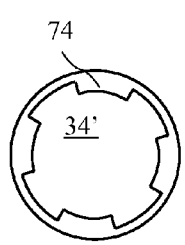
FIG. 62 is a bottom view of a second bottom tamper with cooperates with the tamping lock according to the present invention.

A top view of a tamping lock 70 according to the present invention is shown in FIG. 61 and a bottom view of a second bottom tamper 34' which cooperates with the tamping lock 70 according to the present invention is shown ion FIG. 62. The tamping lock 70 includes teeth 72 which are inserted between and turned to engage lips 74 on the bottom of the bottom tamper 34' to hold the bottom tamper in the down position for filling the brewing material holder 30o with brewing material 41. After the brewing material holder 30o is filled with brewing material and the holder lid 32*b* attached, the tam ping lock is twisted to release the bottom tamper 32*b* to tamp the brewing material.

Figure 63B:
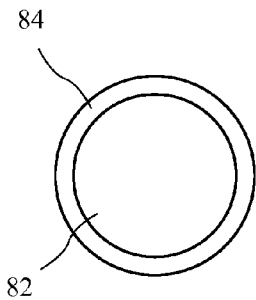
Figure 63A:
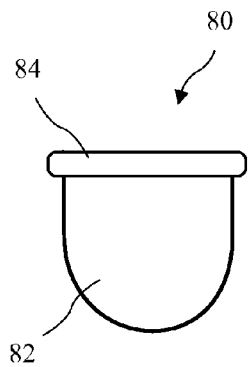

A side view of a filter cup 80 according to the present invention is shown in FIG. 63A and a top view of the filter cup 80 is shown in FIG. 63B. The filter cup 80 includes a ring 84 made a of a material sufficiently strong to hold shape in the proposed use. Filter material 82 is attached to the ring 84. The filter cup 80 is insertable into the brewing material holder and in many embodiments is a replacement for the filter paper cup 40.

Figure 64:
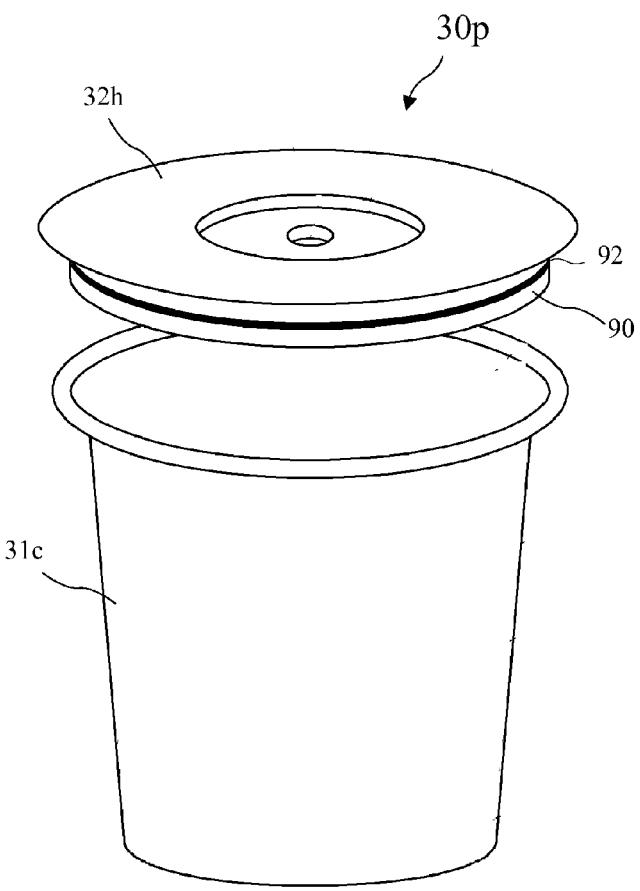
Figure 65:
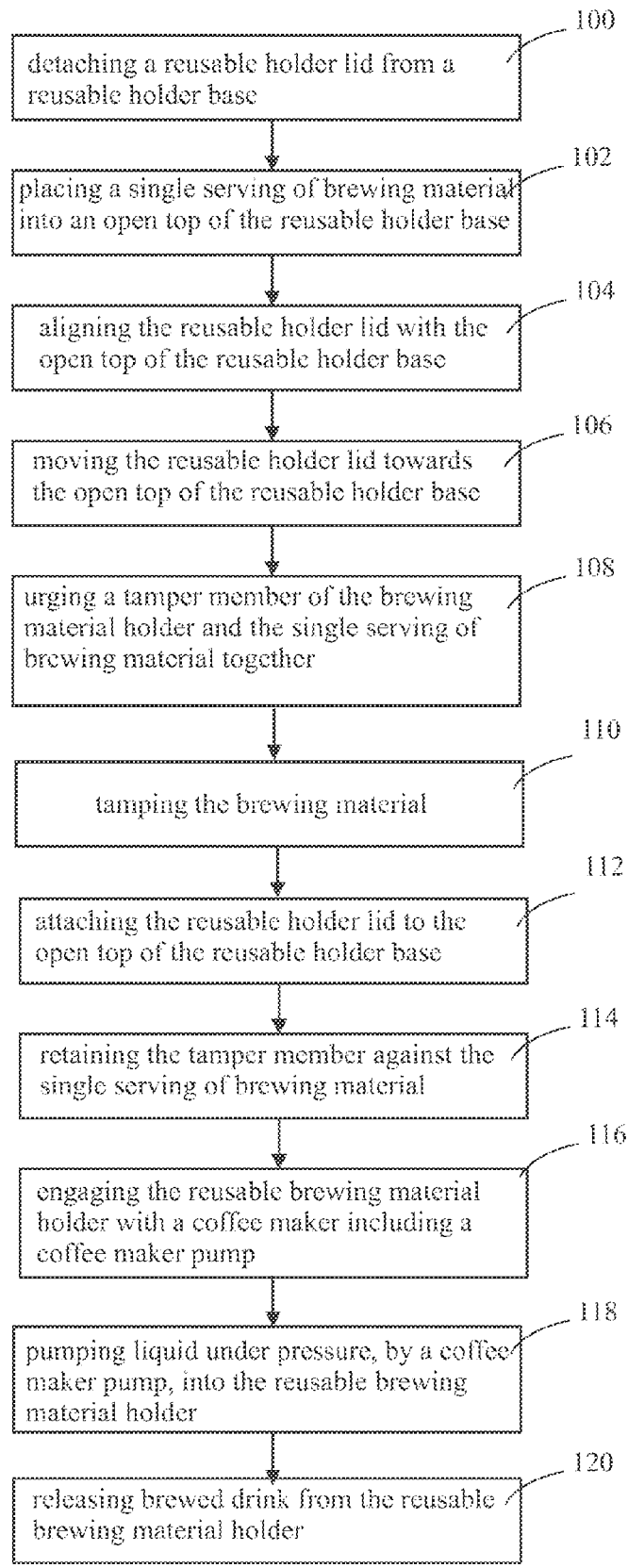

A brewing material holder 30*p* with an embodiment of a lid 32*h* is shown in FIG. 64. The lid 32*h* includes a downward reaching cylindrical portion 90 insertable into a brewing material holder base 31*c*. The cylindrical portion 90 may include an O-ring 92 for sealing the lid 32*h* to the brewing material holder base 31*c*.

While the present invention is described above as placing brewing material in a brewing material holder, the invention may also be practiced by placing prepackaged coffee, for example coffee pods, into the brewing material holder. Further, while the brewing material holder is generally described as having a snap on lid, a screw on lid may also be used, and in general the various elements of different embodiments described above may be mixed to provide new embodiments and such new embodiments are intended to come within the scope of the present invention.

Further, many embodiments are described as including a coffee chamber comprising a filter paper cup. In many cases, a filter cup made of nylon mesh or metal mesh is equally suitable, and any brewing material holder or combination of coffee maker and brewing material holder including a filter chamber which holds coffee and allows the coffee to be tamped as described above is intended to come within the scope of the present invention regardless of the specific filter material.

A method for preparing a brewed beverage from a tamped brewing material contained in a reusable brewing material holder is shown in FIG. 64. The method includes detaching a reusable holder lid from a reusable holder base at step 100, placing a single serving of brewing material into an open top of the reusable holder base at step 102, aligning the reusable holder lid with the open top of the reusable holder base at step 104, moving the reusable holder lid towards the open top of the reusable holder base; at step 106, urging a tamper member of the brewing material holder and the single serving of brewing material together at step 108, tamping the brewing material at step 110, attaching the reusable holder lid to the open top of the reusable holder base at step 112, retaining the tamper member against the single serving of brewing material at step 114, engaging the reusable brewing material holder with a coffee maker including a coffee maker pump at step 116, pumping liquid under pressure, by a coffee maker pump, into the reusable brewing material holder at step 118, and releasing brewed drink from the reusable brewing material holder at step 120. The method may further include placing a filter paper cup into the reusable holder base and placing a single serving of brewing material into the filter paper cup, and a rim of the filter paper cup may be captured between the reusable holder lid and the reusable holder base. The method may alternatively include placing a single serving of brewing material into an open top of the reusable holder base including mesh filtering material separating the interior of the reusable holder base from the exterior of the reusable holder base, and retaining the single serving of brewing material in the reusable holder base by the mesh filtering material. The reusable holder lid may be attached to the open top of the reusable holder base by vertically engaging features of the reusable holder lid with features of the reusable holder base.

The step 108 of urging a tamper member of the brewing material holder and the single serving of brewing material together, may include urging a top tamper member attached to the reusable holder lid towards the single serving of brewing material, and the top tamper member may include a seal sealing against the inside walls of the reusable holder base to reduce or eliminate material escaping between the top tamper and the inside walls of the reusable holder base. The top tamper may be urged against the brewing material by a spring. The liquid maybe pumped by the coffee maker pump into the reusable brewing material holder through a passage in the top tamper and into the brewing material to prepare a serving of brewed drink.

The tamping may also include urging the single serving of brewing material against a bottom tamper member residing in the reusable holder base and the reusable holder base may have straight cylindrical inside walls allowing a better fit between the bottom tamper and the inside walls to reduce or eliminate material escaping between the bottom tamper and the inside walls of the reusable holder base. The bottom tamper may be depressed and retained using a catch, and after attaching the reusable holder lid to the open top of the reusable holder base, the catch may be released to tamp the single serving of brewing material by the force of a spring or resilient block under the bottom tamper.

While the invention herein disclosed has been described by means of specific embodiments and applications thereof, numerous modifications and variations could be made thereto by those skilled in the art without departing from the scope of the invention set forth in the claims.

I claim:

1. A method for preparing a brewed beverage from a tamped brewing material contained in a reusable brewing material holder, the method comprising:

detaching a reusable holder lid of the reusable brewing material holder from a reusable holder base of the reusable brewing material holder;

placing a single serving of brewing material into an open top of the reusable holder base;

aligning the reusable holder lid with the open top of the reusable holder base;

moving the reusable holder lid towards the open top of the reusable holder base;

urging a tamper member of the reusable brewing material holder and the single serving of brewing material together;

attaching the reusable holder lid to the open top of the reusable holder base;

retaining the tamper member against the single serving of brewing material;

engaging the reusable brewing material holder with a coffee maker including a coffee maker pump;

pumping liquid under pressure, by a coffee maker pump, into the reusable brewing material holder; and releasing brewed drink from the reusable brewing material holder, wherein the liquid is pressurized above ambient pressure at entry into the reusable brewing material holder.

2. The method of claim 1, wherein pumping liquid under pressure, by the coffee maker pump, into the reusable brewing material holder comprises pumping liquid under at least one PSI pressure, by the coffee maker pump, into the brewing material.

3. The method of claim 1, wherein urging a tamper member of the brewing material holder, and the single serving of brewing material, together comprises;
   urging a top tamper member attached to the reusable holder lid towards the single serving of brewing material; and
   tamping the single serving of brewing material.

4. The method of claim 3, wherein moving the reusable holder lid towards the open top of the reusable holder base comprises moving the reusable holder lid towards the open top of the reusable holder base having straight cylindrical inside walls allowing a better fit between the top tamper and the inside walls of the reusable holder base.

5. The method of claim 4, wherein urging a top tamper member attached to the reusable holder lid towards the single serving of brewing material comprises urging a top tamper member including a seal sealing against the inside walls of the reusable holder base to reduce or eliminate material escaping between the top tamper and the inside walls of the reusable holder base.

6. The method of claim 5, wherein pumping liquid under pressure, by the coffee maker pump, into the reusable brewing material holder comprises pumping liquid under pressure, by the coffee maker pump, into the reusable brewing material holder through a passage in the top tamper and into the brewing material to prepare a serving of brewed drink.

7. The method of claim 1, wherein urging a tamper member of the brewing material holder, and the single serving of brewing material, together comprises:
   urging the single serving of brewing material against a bottom tamper member residing in the reusable holder base; and
   tamping the single serving of brewing material.

8. The method of claim 7, wherein urging the single serving of brewing material against a bottom tamper member residing in the reusable holder base comprises urging the single serving of brewing material against a bottom tamper member residing in the reusable holder base having straight cylindrical inside walls allowing a better fit between the bottom tamper and the inside walls to reduce or eliminate material escaping between the bottom tamper and the inside walls of the reusable holder base.

9. The method of claim 8, wherein urging the single serving of brewing material against a bottom tamper member residing in the reusable holder base comprises:
   urging the single serving of brewing material against a bottom tamper member supported by a tamping spring in the reusable holder base; and
   compressing the tamping spring.

10. The method of claim 9, further including:
    before placing a single serving of brewing material into an open top of the reusable holder base:
    depressing the bottom tamper; and
    retaining the depressed bottom tamper using a catch; and
    after attaching the reusable holder lid to the open top of the reusable holder base, releasing the catch to tamp the single serving of brewing material.

11. The method of claim 7, wherein urging the single serving of brewing material against a bottom tamper member residing in the reusable holder base comprises:
    urging the single serving of brewing material against a bottom tamper member supported by a resilient block in the reusable holder base; and
    compressing the resilient block.

12. A method for preparing a brewed beverage from a tamped brewing material contained in a reusable brewing material holder, the method comprising:
    detaching a reusable holder lid of the reusable brewing material holder from a reusable holder base of the reusable brewing material holder;
    placing a filter paper cup into the reusable holder base;
    placing a single serving of brewing material into the filter paper cup;
    aligning the reusable holder lid with the open top of the reusable holder base;
    moving the reusable holder lid towards the open top of the reusable holder base;
    urging a tamper member of the reusable brewing material holder and the single serving of brewing material together;
    attaching the reusable holder lid to the open top of the reusable holder base;
    retaining the tamper member against the single serving of brewing material;
    engaging the reusable brewing material holder with a coffee maker including a coffee maker pump;
    pumping liquid under pressure, by a coffee maker pump, into the reusable brewing material holder; and
    releasing brewed drink from the reusable brewing material holder.

13. The method of claim 12, further including capturing a rim of the filter paper cup between the reusable holder lid and the reusable holder base.

14. The method of claim 1, wherein engaging the reusable brewing material holder with a coffee maker including a coffee maker pump comprises:
    opening a coffee maker lid;
    inserting the reusable brewing material holder containing a tamped single serving of brewing material into the coffee maker; and
    closing the coffee maker lid.

15. The method of claim 1, wherein placing a single serving of brewing material into an open top of the reusable holder base comprises placing a single serving of brewing material into an open top of the reusable holder base including mesh filtering material separating the interior of the reusable holder base from the exterior of the reusable holder base, and further including retaining the single serving of brewing material in the reusable holder base by the mesh filtering material.

16. The method of claim 1, wherein attaching the reusable holder lid to the open top of the reusable holder base comprises vertically engaging features of the reusable holder lid with features of the reusable holder base.

17. A method for preparing a brewed beverage from a tamped brewing material contained in a reusable brewing material holder, the method comprising:
    detaching a reusable holder lid of the reusable brewing material holder from a reusable holder base of the reusable brewing material holder;
    placing a single serving of brewing material into an open top of the reusable holder base;
    aligning the reusable holder lid with the open top of the reusable holder base;
    moving the reusable holder lid towards the open top of the reusable holder base;
    urging a top tamper attached to the reusable holder lid against the single serving of brewing material;
    tamping the brewing material;
    compressing a tamping spring residing between the top tamper and the reusable holder lid;
    vertically engaging features of the reusable holder lid with features of the reusable holder base;

retaining the top tamper against the single serving of brewing material by force from the compressed tamping spring;
engaging the reusable brewing material holder with a coffee maker including a coffee maker pump and a heater;
pumping liquid under pressure, by a coffee maker pump, through the heater to heat the liquid;
injecting the heated liquid through the tamped brewing material contained in the reusable brewing material holder to create a brewed drink; and
capturing the brewed drink from the reusable brewing material holder,
wherein the liquid is pressurized above ambient pressure at entry into the reusable brewing material holder.

18. A method for preparing a brewed beverage from a tamped brewing material contained in a reusable brewing material holder, the method comprising:
  detaching a reusable holder lid of the reusable brewing material holder from a reusable holder base of the reusable brewing material holder;
  placing a single serving of brewing material into an open top of the reusable holder base;
  aligning the reusable holder lid with the open top of the reusable holder base;
  moving the reusable holder lid towards the open top of the reusable holder base;
  urging a resilient protruding member of the reusable holder lid and the single serving of brewing material together;
  tamping the brewing material;
  attaching the reusable holder lid to the open top of the reusable holder base;
  retaining the resilient protruding member of the reusable holder lid against the single serving of brewing material;
  engaging the reusable brewing material holder with a coffee maker including a heater and a coffee maker pump;
  pumping liquid under pressure, by a coffee maker pump, through the heater to heat the liquid;
  injecting the heated liquid through the tamped brewing material contained in the reusable brewing material holder to create a brewed drink; and
  capturing the brewed drink from the reusable brewing material holder,
  wherein the liquid is pressurized above ambient pressure at entry into the reusable brewing material holder.

* * * * *